US010284279B2

(12) United States Patent
Wu et al.

(10) Patent No.: US 10,284,279 B2
(45) Date of Patent: May 7, 2019

(54) APPARATUS AND METHOD IN WIRELESS COMMUNICATIONS SYSTEM

(71) Applicant: Sony Corporation, Tokyo (JP)

(72) Inventors: Liang Wu, Jiangsu (CN); Zaichen Zhang, Jiangsu (CN); Weiwei Qin, Jiangsu (CN); Lili Zheng, Jiangsu (CN); Jian Dang, Jiangsu (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/766,035

(22) PCT Filed: Oct. 27, 2016

(86) PCT No.: PCT/CN2016/103572
§ 371 (c)(1),
(2) Date: Apr. 5, 2018

(87) PCT Pub. No.: WO2017/071618
PCT Pub. Date: May 4, 2017

(65) Prior Publication Data
US 2018/0287687 A1 Oct. 4, 2018

(30) Foreign Application Priority Data
Oct. 28, 2015 (CN) .......................... 2015 1 0714157

(51) Int. Cl.
*H04B 7/02* (2018.01)
*H04B 7/08* (2006.01)
(Continued)

(52) U.S. Cl.
CPC ................ *H04B 7/086* (2013.01); *G01S 3/02* (2013.01); *H04B 7/0897* (2013.01); *H04W 52/02* (2013.01); *H04W 64/00* (2013.01)

(58) Field of Classification Search
CPC .... H04B 7/086; H04B 7/0897; H04B 7/0417; H04B 7/0669; H04L 1/0618; H04L 1/06; H04L 25/0204
(Continued)

(56) References Cited

U.S. PATENT DOCUMENTS 6,363,079 B1 3/2002 Barzegar et al.
6,480,748 B1 11/2002 Gerszberg et al.
(Continued)

FOREIGN PATENT DOCUMENTS

| CN | 103138776 A | 6/2013 |
| CN | 104243002 A | 12/2014 |
| CN | 104601211 A | 5/2015 |

OTHER PUBLICATIONS

International Search Report dated Feb. 7, 2017 in PCT/CN2016/103572 filed Oct. 27, 2016.

*Primary Examiner* — Zewdu A Kassa
(74) *Attorney, Agent, or Firm* — Xsensus LLP

(57) ABSTRACT

In a wireless communications system, a base station includes a first number of antennas and a smaller second number of radio frequency links. A base station apparatus includes: a rough arrival angle estimation unit, which estimates a rough arrival angle pair by a second number of antennas and a second number of radio frequency links; a candidate arrival angle estimation unit, which determines a candidate arrival angle pair based on a rough arrival angle pair and beam widths determined by a first number and a second number of antennas, respectively; and a precise arrival angle determination unit, which calculates the difference between the projection component and real component for the candidate arrival angle pairs based on a training tone from the user equipment, and designates the candidate
(Continued)

arrival angle pair with the smallest difference between those components as the precise arrival angle pair.

14 Claims, 16 Drawing Sheets

(51) Int. Cl.
*H04W 52/02* (2009.01)
*G01S 3/02* (2006.01)
*H04W 64/00* (2009.01)

(58) Field of Classification Search
USPC ............. 375/267, 260, 259, 316, 295, 219
See application file for complete search history.

(56) References Cited

U.S. PATENT DOCUMENTS

| | | |
|---|---|---|
| 6,937,595 B2 | 8/2005 | Barzegar et al. |
| 7,590,105 B2 | 9/2009 | Barzegar et al. |
| 2001/0028644 A1 | 10/2001 | Barzegar et al. |
| 2005/0254484 A1 | 11/2005 | Barzegar et al. |
| 2017/0201309 A1* | 7/2017 | Kang .................. H04B 7/0478 |

\* cited by examiner

APPARATUS AND METHOD IN WIRELESS COMMUNICATIONS SYSTEM

This application claims priority to a Chinese Patent Application No. 201510714157.5, titled "APPARATUS AND METHOD IN WIRELESS COMMUNICATIONS SYSTEM", and filed with the Chinese State Intellectual Property Office on Oct. 28, 2015, which is incorporated herein by reference in its entirety.

FIELD

The present disclosure relates to the field of wireless communication technology, and in particular to an apparatus and a method in a wireless communication system for implementing hybrid three-dimensional beamforming based on massive antennas and a small number of radio frequency chains.

BACKGROUND

With continuous development of mobile communications in the future, three-dimensional beamforming technology has drawn more and more attentions. Massive MIMO is considered as one of key technologies for the next generation mobile communication (5G). FIG. 1 shows an example of a scenario of a multi-user multiple input multiple output (MU-MIMO) system with massive antennas, in which one base station and multiple user equipment are arranged in a cell and the base station is provided with massive antennas to provide services to the multiple user equipment. Since massive antennas are provided in the base station, a spatial resolution of the system is improved. In a case where an array of the antennas is a planar array, three-dimensional beamforming may be implemented. Some research has been made on the three-dimensional beamforming technology under a condition of massive antennas in the conventional technology. In the conventional technology, the three-dimensional beamforming is usually implemented by providing the same number of radio frequency chains as the antennas. However, in a case where massive antennas are deployed, cost of radio frequency may become very high, and technical complexity of the system may be also high. In order to reduce the cost and the complexity, the hybrid three-dimensional beamforming technology using a smaller number of radio frequency chains in the system with massive antennas has drawn more and more attentions, but little research has been performed in this aspect at present.

SUMMARY

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above problem, an object of the present disclosure is to provide an apparatus and a method in a wireless communication system for implementing hybrid three-dimensional beamforming using massive antennas and a smaller number of radio frequency chains, thereby implementing optimal communication performance while reducing the cost.

According to an aspect of the present disclosure, an apparatus on a base station side in a wireless communication system is provided. The base station is provided with a first number of antennas and a second number of radio frequency chains, the second number being smaller than the first number. The apparatus includes: a coarse arrival angle estimating unit configured to estimate a pair of coarse arrival angles in a horizontal domain and a vertical domain based on the second number of antennas selected from the first number of antennas and the second number of radio frequency chains; a candidate arrival angle estimating unit configured to determine pairs of candidate arrival angles in the horizontal domain and the vertical domain based on the estimated pair of coarse arrival angles and beam widths in the horizontal domain and the vertical domain determined based on the first number of antennas and the second number of antennas respectively; and an accurate arrival angle determining unit configured to calculate, according to a training signal from user equipment, a difference between a projection component and a real component for each of the pairs of candidate arrival angles, and to determine the pair of candidate arrival angles with a minimum calculated difference as a pair of accurate arrival angles in the horizontal domain and the vertical domain for the user equipment, wherein the projection component is determined by projecting an actual received signal for the training signal of the base station onto a steering vector defined based on each of the pairs of candidate arrival angles, and the real component is determined based on the training signal and a status parameter of a channel between the base station and the user equipment.

According to a preferred embodiment of the present disclosure, the first number of antennas may form a two-dimensional planar antenna array, and the second number of antennas may form a sub array selected from the two-dimensional planar antenna array.

According to another preferred embodiment of the present disclosure, the candidate arrival angle estimating unit is further configured to determine number of the pairs of candidate arrival angles based on relationship between the beam widths in the horizontal domain and the vertical domain determined based on the first number of antennas and the beam widths in the horizontal domain and the vertical domain determined based on the second number of antennas, and determine the pairs of candidate arrival angles based on the determined number by taking the pair of coarse arrival angles as a center, so that the determined number of pairs of candidate arrival angles are distributed evenly within a scope of the beam widths in the horizontal domain and the vertical domain determined based on the second number of antennas.

According to another preferred embodiment of the present disclosure, the coarse arrival angle estimating unit is further configured to estimate the pair of coarse arrival angles with a Multiple Signal Classification (MUSIC) method or an Estimation of Signal Parameters Via Rotational Invariance Techniques (ESPRIT) method.

According to another preferred embodiment of the present disclosure, the difference may indicate a Euclidean distance between the projection component and the real component.

According to another preferred embodiment of the present disclosure, the status parameter of the channel includes a channel slow-varying characteristic parameter.

According to another preferred embodiment of the present disclosure, the apparatus further includes an analog beamforming vector generating unit configured to generate an analog beamforming vector based on the pair of accurate arrival angles; a physical channel determining unit configured to determine a physical channel between the base station and the user equipment based on the analog beamforming vector and an uplink equivalent channel estimated according to a sounding reference signal from the user equipment; and a digital precoding vector generating unit configured to generate a digital precoding vector based on the analog beamforming vector, the physical channel and a predetermined reception rule.

According to another preferred embodiment of the present disclosure, the apparatus further includes an analog beamforming vector generating unit configured to generate an analog beamforming vector based on the pair of accurate arrival angles and a carrier frequency; and a digital precoding vector generating unit configured to generate a digital precoding vector based on channel status information fed back by the user equipment, wherein the channel status information is obtained by performing, by the user equipment, downlink equivalent channel estimation according to a reference signal, which is transmitted by the base station based on the pair of accurate arrival angles.

According to another preferred embodiment of the present disclosure, the apparatus is the base station, and the base station further includes a communication unit configured to receive uplink data from the user equipment according to an uplink equivalent channel, and transmit downlink data to the user equipment based on the analog beamforming vector and the digital precoding vector, wherein the uplink equivalent channel is estimated based on a sounding reference signal from the user equipment.

According to another preferred embodiment of the present disclosure, the communication unit is further configured to transmit to the user equipment an instruction for transmitting the training signal or the sounding reference signal.

According to another preferred embodiment of the present disclosure, the apparatus further includes a distance determining unit configured to determine a distance from the base station to the user equipment based on the determined pair of accurate arrival angles.

According to another aspect of the present disclosure, a method on a base station side in a wireless communication system is further provided. The base station is provided with a first number of antennas and a second number of radio frequency chains, the second number being smaller than the first number. The method includes: a coarse arrival angle estimating step of estimating a pair of coarse arrival angles in a horizontal domain and a vertical domain based on the second number of antennas selected from the first number of antennas and the second number of radio frequency chains; a candidate arrival angle estimating step of determining pairs of candidate arrival angles in the horizontal domain and the vertical domain based on the estimated pair of coarse arrival angles and beam widths in the horizontal domain and the vertical domain determined based on the first number of antennas and the second number of antennas respectively; and an accurate arrival angle determining step of calculating, according to a training signal from user equipment, a difference between a projection component and a real component for each of the pairs of candidate arrival angles, and determining the pair of candidate arrival angles with a minimum calculated difference as a pair of accurate arrival angles in the horizontal domain and the vertical domain for the user equipment, wherein the projection component is determined by projecting an actual received signal for the training signal of the base station onto a steering vector defined based on each of the pairs of candidate arrival angles, and the real component is determined based on the training signal and a status parameter of a channel between the base station and the user equipment.

According to another aspect of the present disclosure, an apparatus on a user equipment side in a wireless communication system is further provided, the apparatus including: a communication unit configured to transmit, in response to an instruction from a base station, a training signal to the base station for the base station to determine, using a first number of antennas and a second number of radio frequency chains, a pair of arrival angles in a horizontal domain and a vertical domain for the user equipment, the second number being smaller than the first number.

According to another aspect of the present disclosure, a method on a user equipment side in a wireless communication system is further provided, the method including: transmitting, in response to an instruction from a base station, a training signal to the base station for the base station to determine, using a first number of antennas and a second number of radio frequency chains, a pair of arrival angles in a horizontal domain and a vertical domain for the user equipment, the second number being smaller than the first number.

According to another aspect of the present disclosure, an electronic device is further provided, which may include a transceiver and at least one processor configured to perform the above-described methods or functions of corresponding units in a wireless communication system according to the present disclosure.

According to other aspects of the present disclosure, it is further provided computer program codes and a computer program product for implementing the above methods according to the present disclosure, and a computer readable storage medium on which the computer program codes for implementing the above methods according to the present disclosure are recorded.

According to the embodiments of the present disclosure, a pair of accurate arrival angles in the horizontal domain and the vertical domain for target user equipment is determined by using massive antennas and a smaller number of radio frequency chains in two steps so as to implement the hybrid three-dimensional beamforming, thereby reducing the cost, decreasing mutual interference among user equipment, and improving an achievable data rate of the system.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
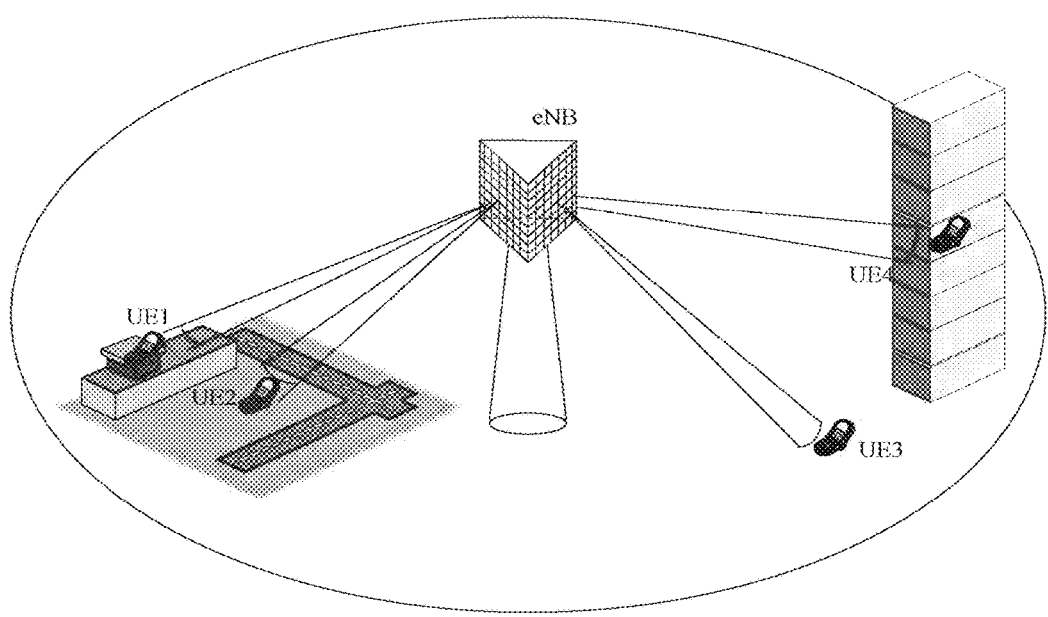
FIG. 1 is a schematic diagram showing an example of a scenario of a multi-user multiple input multiple output (MU-MIMO) system with massive antennas.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or processing steps closely relevant to the solutions of the disclosure are illustrated in the drawings while other details less relevant to the disclosure are omitted so as not to obscure the disclosure due to those unnecessary details.

Hereinafter, embodiments of the present disclosure are described in detail with reference to FIGS. 1 to 21.

Figure 2:
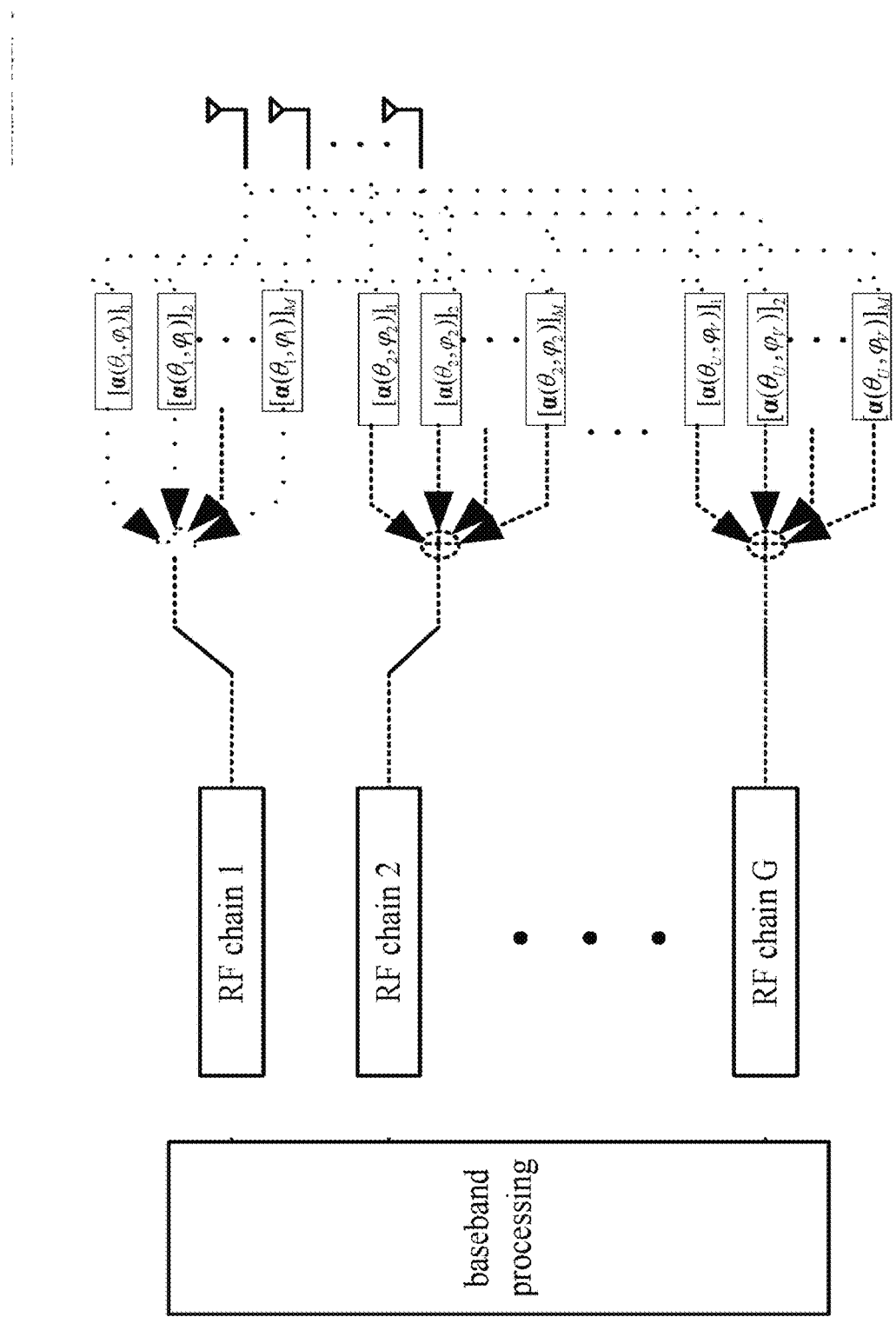
FIG. 2 is a schematic diagram showing an exemplary structure of a massive MIMO base station for hybrid beamforming according to an embodiment of the present disclosure.

First, an exemplary structure of a massive MIMO base station for hybrid beamforming according to an embodiment of the present disclosure is described with reference to FIG. 2. FIG. 2 is a schematic diagram showing an exemplary structure of a massive MIMO base station for hybrid beamforming according to an embodiment of the present disclosure.

As shown in FIG. 2, it is assumed that a base station is provided with T antennas, K user equipment exist in a cell, and there are G radio frequency chains between the base station and the user equipment, where a relation of $T \gg G \geq K$ is met. That is, in the MU-MIMO system, the number of the radio frequency chains is much smaller than the number of antennas provided for the base station, thus complexity and the cost of the system can be greatly reduced. It should be understood that in the three-dimensional beamforming technology, the key lies in determining a beam direction of user equipment. Since the number of the radio frequency chains in the system is much smaller than the number of antennas provided for the base station, a new challenge is posed in acquiring status information of a channel between the base station and the user equipment.

Hereinafter, the technology according to an embodiment of the present disclosure in which a beam direction with respect to user equipment is determined in two steps in an angle domain based on massive antennas and a smaller number of radio frequency chains is described in detail.

Figure 3:
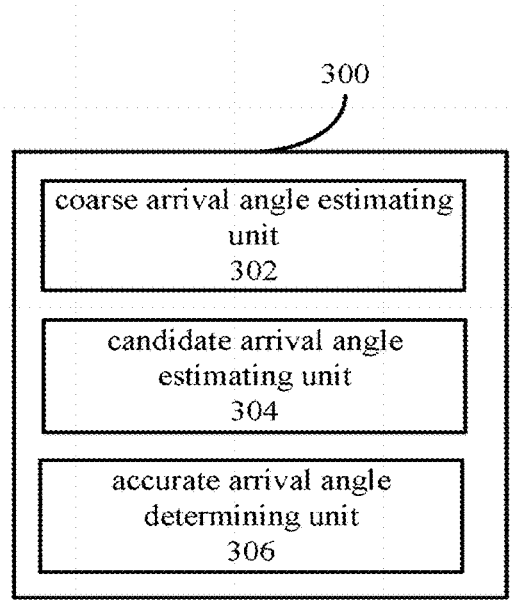
FIG. 3 is a block diagram showing an example of a functional configuration of an apparatus on a base station side in a wireless communication system according to an embodiment of the present disclosure.

FIG. 3 is a block diagram showing an example of a functional configuration of an apparatus on a base station side in a wireless communication system according to an embodiment of the present disclosure. In the wireless communication system, it is assumed that the base station is provided with a first number (assumed to be T) of antennas and a second number (assumed to be G) of radio frequency chains, the second number being smaller than the first number, and there are, for example, K user equipment ($1 \leq K \leq G$).

As shown in FIG. 3, an apparatus 300 according to the example may include a coarse arrival angle estimating unit 302, a candidate arrival angle estimating unit 304, and an accurate arrival angle determining unit 306.

As described above, since the number of the radio frequency chains is smaller than the number of the antennas, the present disclosure proposes determining a pair of arrival angles (including an arrival angle in a horizontal domain and an arrival angle in a vertical domain) for the user equipment in two steps.

The coarse arrival angle estimating unit 302 may be configured to estimate a pair of coarse arrival angles in a horizontal domain and a vertical domain based on the second number of antennas selected from the first number of antennas and the second number of radio frequency chains.

Figure 4:
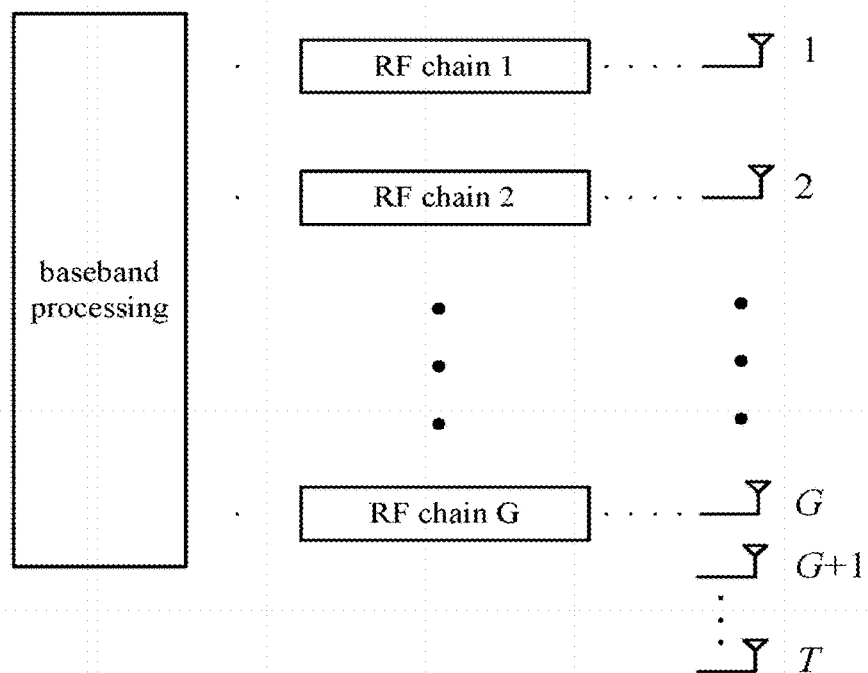
FIG. 4 is a schematic diagram showing an exemplary configuration for coarse arrival angle estimation according to an embodiment of the present disclosure.

FIG. 4 is a schematic diagram showing an exemplary configuration for coarse arrival angle estimation according to an embodiment of the present disclosure. As shown in FIG. 4, G antennas are selected from T antenna by allocating one antenna to each of the G radio frequency chains. In the embodiment of the present disclosure, preferably, the first number of (that is, T) antennas form a two-dimensional planar antenna array, and the selected G antennas form a sub-array (including G antennas) of the two-dimensional planar antenna array. It should be noted that there is no particular limitation on a rule for allocating antennas to the G radio frequency chains, as long as the selected G antennas may form a sub-array of the two-dimensional planar antenna array of the T antennas.

Preferably, the coarse arrival angle estimating unit 302 may estimate the pair of coarse arrival angles with a Multiple Signal Classification (MUSIC) method or an Estimation of Signal Parameters Via Rotational Invariance Techniques (ESPRIT) method. Reference may be made to the related description in the conventional technology for a specific estimating method, and no redundant description will be made here anymore.

Here, it is assumed that the pair of coarse arrival angles in the horizontal domain and the vertical domain estimated by the coarse arrival angle estimating unit 302 is denoted as $(\tilde{\phi}_i, \tilde{\mu}_i)$ i=1, 2, . . . , G. Since the estimation is performed based on the G antennas, an angular resolution may be considered to be 1/G.

The candidate arrival angle estimating unit 304 may be configured to determine pairs of candidate arrival angles in the horizontal domain and the vertical domain based on the estimated pair of coarse arrival angles and beam widths in the horizontal domain and the vertical domain which are respectively determined based on the first number of antennas and the second number of antennas.

As described above, the angular resolution is 1/G in a case where G antennas are used, but the base station is actually provided with T antennas, that is, an actual angular resolution should be 1/T. In other words, a pair of arrival angles for target user equipment should be further accurately determined based on the above estimated pair of coarse arrival angles.

Specifically, the candidate arrival angle estimating unit 304 may be further configured to determine the number of the pairs of candidate arrival angles based on relationship between the beam widths in the horizontal domain and the vertical domain determined based on the first number of antennas and the beam widths in the horizontal domain and the vertical domain determined based on the second number of antennas, and determine the pairs of candidate arrival angles based on the determined number by taking the pair of coarse arrival angles as a center, so that the determined number of pairs of candidate arrival angles are distributed evenly within a scope of the beam widths in the horizontal domain and the vertical domain determined based on the second number of antennas.

Specifically, description will be made herein by taking a half-power beam width as an example of the beam width, but the meaning of the beam width is not limited thereto. Since an evenly distributed two-dimensional planar antenna array is used by the base station, a vertical half-power beam width in a case of using T antennas may be represented as the following expression (1):

$$\Theta_e(d = \lambda/2; T; \theta_0) = \frac{1.06}{\sqrt{\sqrt{T} - 1}} \cdot \frac{1}{\cos(\theta_0)} \quad (1)$$

where λ represents a wavelength and $\theta_o$ is a vertical arrival angle.

A horizontal half-power beam width in this case may be represented as the following expression (2):

$$\Theta_h(d = \lambda/2; T) = \frac{1.06}{\sqrt{\sqrt{T} - 1}} \quad (2)$$

Accordingly, a vertical half-power beam width and a horizontal half-power beam width in a case of using G antennas can be obtained. Since the angular resolution in a case of using G antennas is smaller than the angular resolution in a case of using T antennas, the half-power beam width in a case of using G antennas is greater than the half-power beam width in a case of using T antennas. The number of possible pairs of the candidate arrival angles may be determined based on a numerical relationship between G and T. Specifically, as an example, a variable q is defined and represented as e.g. the following expression (3):

$$q = \left\lfloor \frac{\Theta_e(d = \lambda/2; G; \theta_0)}{\Theta_e(d = \lambda/2; T; \theta_0)} = \frac{\sqrt{\sqrt{T} - 1}}{\sqrt{\sqrt{G} - 1}} \right\rfloor \quad (3)$$

where $\lfloor \cdot \rfloor$ represents a flooring operation, q represents the number of the candidate arrival angles in the horizontal domain or the vertical domain which are estimated based on the pair of coarse arrival angles, and the number of the pairs of candidate arrival angles is q×q.

Then, the pairs of candidate arrival angles are determined based on the determined number by taking the pair of coarse arrival angles as a center, such that the determined number of pairs of candidate arrival angles are evenly distributed within a scope of half-power beam widths in the horizontal domain and the vertical domain which are determined based on the G antennas. For example, the pairs of candidate arrival angles may be determined according to the following expression (4):

$$(\tilde{\phi}_{(i,j)}, \tilde{\mu}_{(i,l)}) = \quad (4)$$
$$\left( \tilde{\phi}_i + \frac{2j-q-1}{2q} \Theta_h(d = \lambda/2; G), \tilde{\mu}_i + \frac{2l-q-1}{2q} \Theta_e(d = \lambda/2; G; \tilde{\mu}_i) \right)$$

where, l, j=1, . . . q respectively represent sequence numbers of arrival angles in the vertical direction and the horizontal direction.

Figure 5:
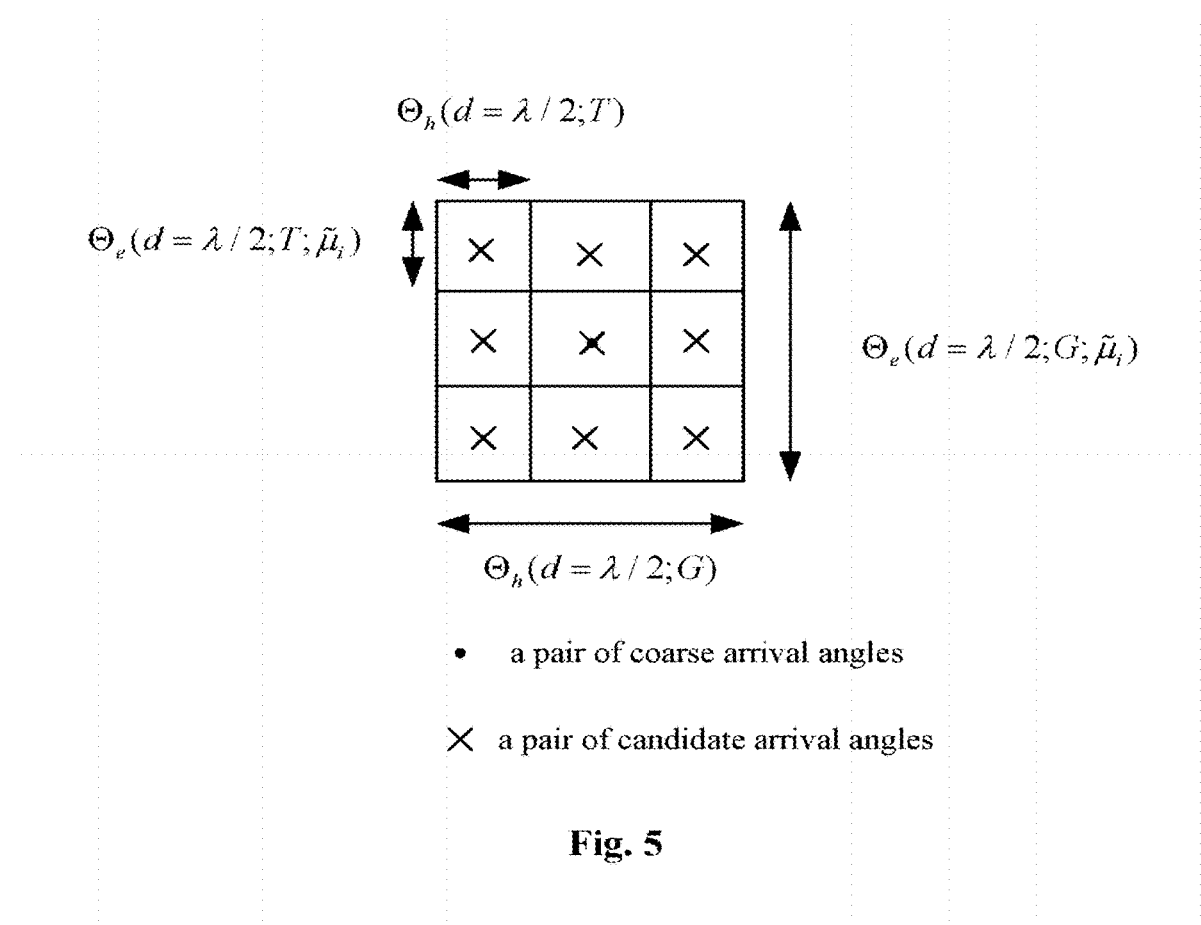
FIG. 5 is a schematic diagram showing candidate arrival angle estimation according to an embodiment of the present disclosure.

FIG. 5 is a schematic diagram showing candidate arrival angle estimation according to an embodiment of the present disclosure. In FIG. 5, a symbol "●" indicates the pair of coarse arrival angles estimated by the coarse arrival angle estimating unit 302 described above, and a symbol "×" indicates the pairs of candidate arrival angles determined, for example, according to the above expression (4). It can be seen from FIG. 5 that the pairs of candidate arrival angles are evenly distributed within a scope of the half-power beam widths in the horizontal domain and the vertical domain, which are determined based on the G antennas, based on for example the number q determined above by taking the pair of coarse arrival angles as a center.

It should be noted that the expressions (3) and (4) given above for respectively determining the number of the pairs of candidate arrival angles and a distribution of the pairs of candidate arrival angles are only preferred examples, the above expressions (3) and (4) may be modified by those skilled in the art based on the principle of the present disclosure, and such modification is considered to fall within the scope of the present disclosure. As an example, the candidate arrival angle estimating unit 304 may also determine, based on the estimated pair of coarse arrival angles and the beam widths in the horizontal domain and the vertical domain determined based on the G antennas by taking the estimated pair of coarse arrival angles as a center, a predetermined number of pairs of candidate arrival angles in the vicinity of the estimated pair of coarse arrival angles at a predetermined angle interval (for example, a difference between any two of the respective candidate arrival angles is 1°).

The accurate arrival angle determining unit 306 may be configured to calculate, according to a training signal from the user equipment, a difference between a projection component and a real component for each of the pairs of candidate arrival angles, and determine the pair of candidate arrival angles with a minimum calculated difference as a pair of accurate arrival angles in the horizontal domain and the vertical domain for the user equipment. The projection component is determined by projecting an actual received signal for the training signal of the base station onto a steering vector defined based on each of the pairs of candidate arrival angles, and the real component is determined based on the training signal and a status parameter of a channel between the base station and the user equipment.

Preferably, the difference described above may represent a Euclidean distance between the projection component and the real component, and the status parameter of the channel described above may include a channel slow-varying characteristic parameter, for example, including a large scale fading coefficient and a K factor of Rayleigh fading.

Specifically, as an example, the process of determining the pair of accurate arrival angles is described by taking a Rician channel model as an example. The accurate arrival angle determining unit 306 may define a set of steering vectors for all user equipment existing in a cell covered by the base station based on the determined pairs of candidate arrival angles. The steering vector may be represented as the following expressions (5) and (6):

$$\{\alpha(\tilde{\phi}_{(i,j)}, \tilde{\mu}_{(i,l)}), i = 1, 2, \ldots, K; j, l = 1, \ldots, q\} \quad (5)$$

$$\alpha(\phi, \mu) = \exp\left(j\frac{2\pi}{\lambda_0}\begin{bmatrix} x_1\sin\phi\cos\mu + y_1\sin\phi\sin\mu \\ x_2\sin\phi\cos\mu + y_2\sin\phi\sin\mu \\ \vdots \\ x_T\sin\phi\cos\mu + y_T\sin\phi\sin\mu \end{bmatrix}\right) \quad (6)$$

where K represents the number of the user equipment existing in the cell covered by the base station, and q represents the number of the candidate arrival angles in the horizontal domain or the vertical domain determined in, for example, the above way.

Then, the accurate arrival angle determining unit 306 maps the actual received signal (represented as a vector y here) for the training signal from the user equipment of the base station onto spatial coordinates, and defines, for example, the following projection component:

$$\rho_{(i,j,l)} = \frac{\alpha(\tilde{\phi}_{(i,j)}, \tilde{\mu}_{(i,l)})^H y}{\alpha(\tilde{\phi}_{(i,j)}, \tilde{\mu}_{(i,l)})^H \alpha(\tilde{\phi}_{(i,j)}, \tilde{\mu}_{(i,l)})} \quad (7)$$

Next, for k-th user equipment among the K user equipment, it is assumed that the base station already knows the status parameter of the channel, that is, including the large-scale fading coefficient and the K factor of Rayleigh fading described above, for the k-th user equipment, then the accurate arrival angle determining unit 306 may determine the pair of accurate arrival angles for the k-th user equipment by, for example, a search process. In the search process, the pair of accurate arrival angles for the k-th user equipment is determined among the estimated pairs of candidate arrival angles by calculating a difference between the projection component obtained above and the real component. For example, the search process may be represented as, for example, the following expression (8):

$$(i_k, j_k, l_k) = \arg\left\{\min_{i,j,l}\left\{\left\|g_{(k)}\sqrt{\frac{K_{(k)}}{1+K_{(k)}}}x_k - \rho_{(i,j,l)}\right\|\right\}\right\} \quad (8)$$

where $x_k$ is a training signal which is transmitted by the user equipment in response to an instruction from the base station and used for the base station to determine the pair of accurate arrival angles and is known by the base station; $g_{(k)}$ represents the large-scale fading coefficient from the k-th user equipment to the base station; $K_{(k)}$ represents the K factor of Rayleigh fading of the Rician channel of the k-th user equipment; and $$g_{(k)}\sqrt{\frac{K_{(k)}}{1+K_{(k)}}}x_k$$

represents, for example, the real component described above, which is determined based on the training signal $x_k$ and the status parameter of the channel between the base station and the user equipment.

In this way, by calculating the Euclidean distance between the projection component and the real component, the pair of accurate arrival angles for each of the user equipment can be determined according to a minimum distance rule, and thus a beam direction with respect to the user equipment can be determined. Therefore, a beam weight for the k-th user equipment may be represented as, for example, the following expression (9):

$$w_k = \alpha(\tilde{\phi}_{(i_k,j_k)}, \tilde{\mu}_{(i_k,j_k)}) \qquad (9)$$

It should be understood that the above expressions (5) to (9) for determining the pair of accurate arrival angles are only preferred examples, and the above calculation expressions can be modified by those skilled in the art based on the principle of the present disclosure, as long as such modification can represent the difference between a real received signal and the received signal for the training signal based on the pairs of candidate arrival angles.

It can be seen from the above description that, according to the embodiment of the present disclosure, in a case of using massive antennas and a smaller number of radio frequency chains, an accurate beam direction for each of the user equipment may be determined in two steps (that is, the pair of coarse arrival angles is determined first, and then the pair of accurate arrival angles is determined). Thus, the system performance can be optimized while reducing the cost. Then, the base station may receive uplink data and transmit downlink data with respect to the user equipment based on the determined pair of accurate arrival angles (that is, the beam direction). In a time-division duplexing mode, since an uplink channel and a downlink channel are reciprocal, the base station can transmit downlink data using the same analog beamforming vector and the same digital precoding vector as those in an uplink reception process. In a frequency-division duplexing mode, since the uplink channel and the downlink channel are not reciprocal, in order to realize three-dimensional beamforming, it is required for the user equipment to estimate downlink channel status information and feed the estimated downlink channel status information back to the base station for the base station to transmit downlink data. Configuration examples of an apparatus on the base station side in the time-division duplexing mode and the frequency-division duplexing mode are described below with reference to FIG. 6 and FIG. 7, respectively.

Figure 6:
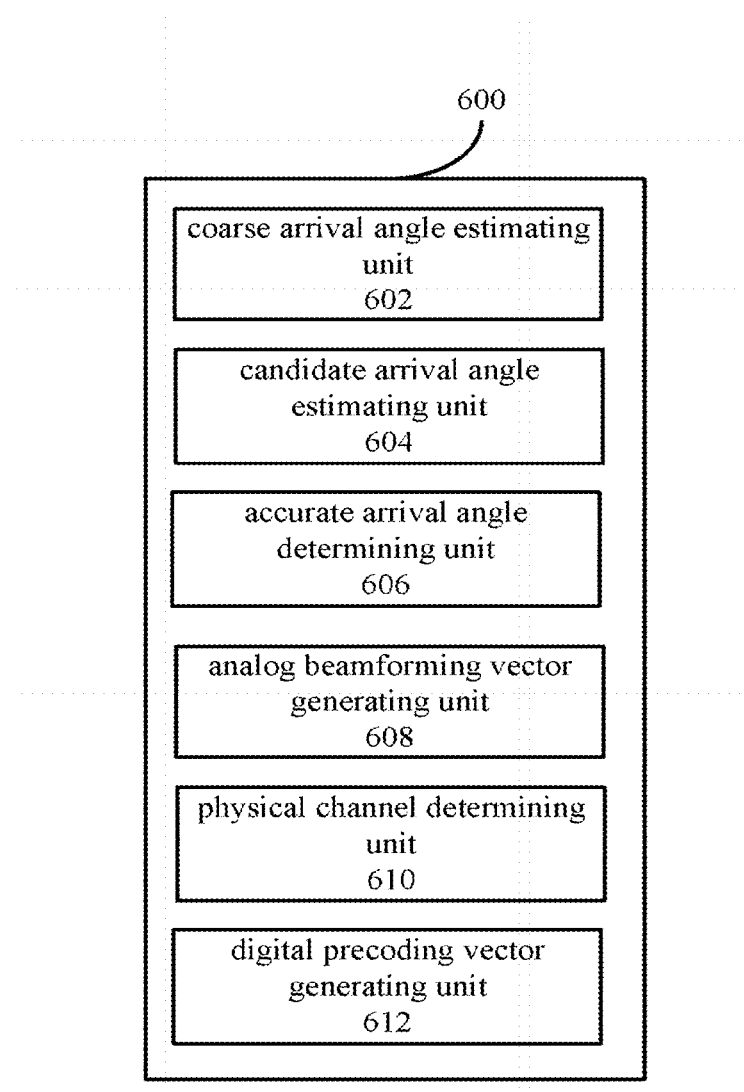
FIG. 6 is a block diagram showing another example of a functional configuration of an apparatus on a base station side in a wireless communication system according to an embodiment of the present disclosure.

FIG. 6 is a block diagram showing another example of a functional configuration of an apparatus on a base station side in a wireless communication system according to an embodiment of the present disclosure. The example shown in FIG. 6 generally applies to the time-division duplexing mode.

As shown in FIG. 6, an apparatus 600 according to the example may include a coarse arrival angle estimating unit 602, a candidate arrival angle estimating unit 604, an accurate arrival angle determining unit 606, an analog beamforming vector generating unit 608, a physical channel determining unit 610 and a digital precoding vector generating unit 612. Examples of functional configurations of the coarse arrival angle estimating unit 602, the candidate arrival angle estimating unit 604 and the accurate arrival angle determining unit 606 are substantially the same as those of the corresponding units described above with reference to FIG. 3, and are not described repeatedly here anymore. In the following, only examples of functional configurations of the analog beamforming vector generating unit 608, the physical channel determining unit 610 and the digital precoding vector generating unit 612 are described in detail.

The analog beamforming vector generating unit 608 may be configured to generate an analog beamforming vector based on the determined pair of accurate arrival angles.

Specifically, a beam weight of each of the user equipment may be represented as $w_k$, which is determined according to the above expressions (5) to (9), thus the base station may obtain analog beamforming vectors for K user equipment existing in the cell, which are represented as: $[w_1, w_2, \ldots, w_K]$.

The physical channel determining unit 610 may be configured to determine a physical channel between the base station and the user equipment based on the analog beamforming vector and an uplink equivalent channel estimated according to a sounding reference signal from the user equipment.

Specifically, after the analog beamforming reception, the equivalent channel from the user equipment to the base station may be expressed as: $\tilde{H} = [w_1, w_2, \ldots, w_K]^H H$, where $(\cdot)^H$ denotes a conjugate transpose. The uplink equivalent channel $\tilde{H}$ may be estimated based on a sounding reference signal (SRS) which is transmitted by the user equipment in response to an instruction of the base station. The physical channel determining unit 610 may determine a physical channel H based on the determined analog beamforming vector and the estimated uplink equivalent channel. It should be understood that as described above, the uplink channel and the downlink channel are reciprocal in the TDD mode, therefore, the physical channel H can be used for receiving uplink data and transmitting downlink data.

The digital precoding vector generating unit 612 may be configured to generate a digital precoding vector based on the analog beamforming vector, the determined physical channel and a predetermined reception rule.

Digital precoding may be minimum mean square error (MMSE) precoding or zero forcing (ZF) precoding. In a case of using the zero-forcing precoding, the digital precoding vector may be determined, for example, according to the following expression (10):

$$(H^T[w_1, w_2, \ldots, w_k]^*)^{-1} \qquad (10)$$

In this way, the base station may receive uplink data from the user equipment according to the uplink equivalent channel, and transmit downlink data to the user equipment based on the determined analog beamforming vector and the digital precoding vector, thereby implementing the three-dimensional beamforming.

Specifically, in a case of uplink data reception, a signal received by the base station may be represented as:

$$y = Hx + n$$

where $x = [x_1, x_2, \ldots, x_K]^T$, $x_k$ is a signal transmitted by the k-th user equipment, $(\cdot)^T$ indicates a transpose, and n is a noise vector.

In this case, the data may be received by using the minimum mean square error (MMSE) reception algorithm or zero forcing (ZF) reception algorithm:

$$\hat{x} = \tilde{H}^{-1}[w_1, w_2, \ldots, w_K]^H Hx + \tilde{H}^{-1}[w_1, w_2, \ldots, w_K]n$$
$$= [x_1, x_2, \ldots, x_K]^T + \tilde{n}$$

where $\tilde{n} = \tilde{H}^{-1}[w_1, w_2, \ldots, w_K]n$.

In a case of downlink data transmission, when for example zero-forcing precoding is used, data received from the base station by the K user equipment may be represented as:

$$b = H^T a + z$$

$$= H^T \underbrace{[w_1, w_2, \ldots, w_K]^*}_{\text{analog precoding} \atop \text{(beam allocation)}} \underbrace{(H^T[w_1, w_2, \ldots, w_K]^*)^{-1}}_{\text{digital precoding}}$$

$$[a_1, a_2, \ldots, a_K]^T + z$$

$$= [a_1, a_2, \ldots, a_K]^T + z$$

where $a=[a_1, a_2, \ldots, a_K]$, $a_k$ denotes a signal transmitted by the base station to the k-th user equipment, z denotes a noise vector, and (•)* denotes an adjoint matrix. It can be seen that there is no mutual interference among the user equipment, thereby improving quality of the signal received by the user equipment.

Figure 7:
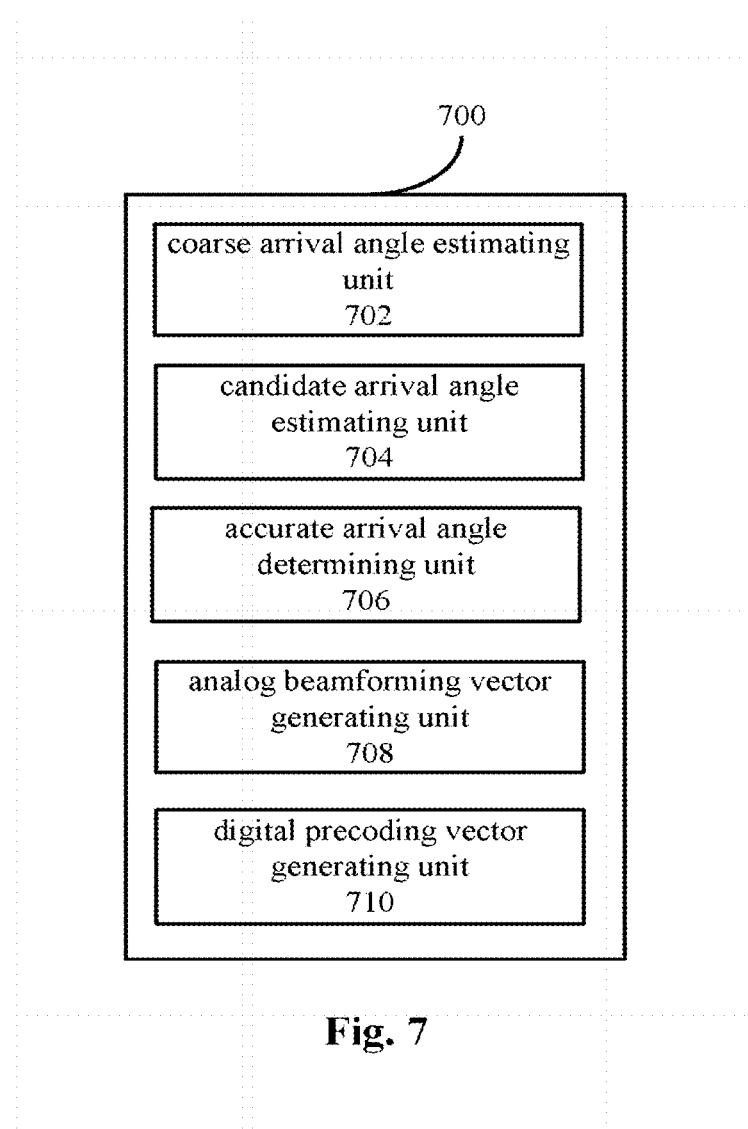
FIG. 7 is a block diagram showing another example of a functional configuration of an apparatus on a base station side in a wireless communication system according to an embodiment of the present disclosure.

An example of a functional configuration of an apparatus on a base station side in the frequency division duplexing mode is described below with reference to FIG. 7. FIG. 7 is a block diagram showing another example of a functional configuration of an apparatus on a base station side in a wireless communication system according to an embodiment of the present disclosure. The example shown in FIG. 7 generally applies to the frequency division duplexing mode.

As shown in FIG. 7, an apparatus 700 according to the example may include a coarse arrival angle estimating unit 702, a candidate arrival angle estimating unit 704, an accurate arrival angle determining unit 706, an analog beamforming vector generating unit 708 and a digital precoding vector generating unit 710. Examples of functional configurations of the coarse arrival angle estimating unit 702, the candidate arrival angle estimating unit 704 and the accurate arrival angle determining unit 706 are substantially the same as those of the corresponding units described above with reference to FIG. 3, and are not described repeatedly here anymore. Only examples of functional configurations of the analog beamforming vector generating unit 708 and the digital precoding vector generating unit 710 are described in detail below.

The analog beamforming vector generating unit 708 may be configured to generate an analog beamforming vector based on the pair of accurate arrival angles and a carrier frequency.

The digital precoding vector generating unit 710 may be configured to generate a digital precoding vector based on channel status information fed back from the user equipment. The channel status information is obtained by the user equipment by estimating a downlink equivalent channel according to a reference signal transmitted by the base station using the pair of accurate arrival angles.

In the frequency-division duplexing mode, since the uplink channel and the downlink channel are not reciprocal, it is required that the user equipment estimates downlink channel status information and feeds it back to the base station. Specifically, in the frequency division duplexing mode, the base station uses the determined pair of accurate arrival angles for directional downlink beam, and transmits a reference signal (for example, a cell-specific reference signal (CRS), a channel status indicator-reference signal (CSI-RS) or the like) to the user equipment based on the determined pair of accurate arrival angles for the user equipment to estimate the downlink channel status, and the digital precoding vector generating unit 810 may generate, based on the downlink channel status information fed back from the user equipment, a digital precoding vector used for downlink data transmission.

Similar to the case in the time division duplexing mode described above, the base station may receive uplink data from the user equipment according to the uplink equivalent channel, and transmits downlink data to the user equipment using the analog beamforming vector and the digital precoding vector. The uplink equivalent channel is estimated based on the sounding reference signal from the user equipment. The process of receiving the uplink data and transmitting the downlink data is substantially the same as that in the above-described time-division duplexing mode, and is not described repeatedly here anymore.

Preferably, each of the above-described apparatuses 300, 600 and 700 on the base station side may be a separate processing chip on the base station side or may be the base station itself. In the case where each of the above-described apparatuses 300, 600 and 700 on the base station side is the base station itself, the base station may further include a communication unit, which is configured to receive uplink data from the user equipment according to the uplink equivalent channel and to transmit downlink data to the user equipment based on the analog beamforming vector and the digital precoding vector.

Preferably, the communication unit may be further configured to transmit to the user equipment an instruction for transmitting the training signal or the sounding reference signal.

In the above embodiments, a direction of the user equipment can be determined accurately by determining the pair of accurate arrival angles in the horizontal domain and the vertical domain for the user equipment. A configuration capable of determining a distance to the user equipment according to an embodiment of the present disclosure is described below with reference to FIG. 8.

Figure 8:
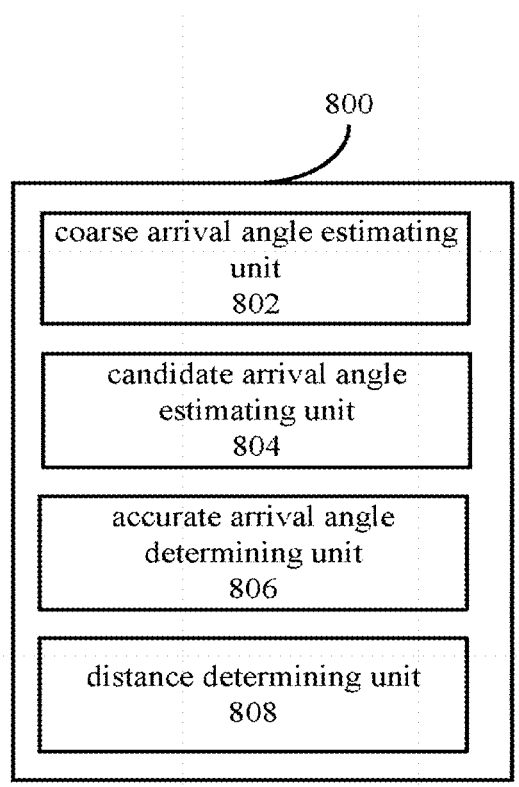
FIG. 8 is a block diagram showing another example of a functional configuration of an apparatus on a base station side in a wireless communication system according to an embodiment of the present disclosure.

FIG. 8 is a block diagram showing another example of a functional configuration of an apparatus on a base station side in a wireless communication system according to an embodiment of the present disclosure.

As shown in FIG. 8, an apparatus 800 according to the example may include a coarse arrival angle estimating unit 802, a candidate arrival angle estimating unit 804, an accurate arrival angle determining unit 806 and a distance determining unit 808. Examples of functional configurations of the coarse arrival angle estimating unit 802, the candidate arrival angle estimating unit 804, and the accurate arrival angle determining unit 806 are substantially the same as those of the corresponding units described above with reference to FIG. 3, and are not described repeatedly here anymore. Only an example of a functional configuration of the distance determining unit 808 is described in detail below.

The distance determining unit 808 may be configured to determine a distance from the base station to the user equipment based on the determined pair of accurate arrival angles. For example, the base station may transmit, for example, a detection signal to the user equipment based on the determined pair of accurate arrival angles, and the distance determining unit 808 may determine the distance from the base station to the user equipment based on, for example, a reception power and/or a reception strength of the user equipment for the detection signal. In this way, both the distance to the user equipment and the direction of the user equipment can be determined.

Next, corresponding to the above-described embodiment of the apparatus on the base station side, an example of a functional configuration of an apparatus on a user equipment side is described below.

Figure 9:
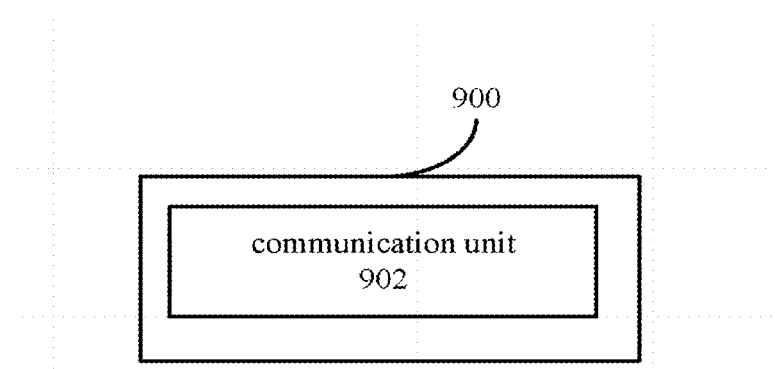
FIG. 9 is a block diagram showing an example of a functional configuration of an apparatus on a user equipment side in a wireless communication system according to an embodiment of the present disclosure.

FIG. 9 is a block diagram showing an example of a functional configuration of an apparatus on a user equipment side in a wireless communication system according to an embodiment of the present disclosure.

As shown in FIG. 9, an apparatus 900 according to the example may include a communication unit 902, which is configured to transmit a training signal to a base station in response to an instruction from the base station, for the base station to determine, using a first number of antennas and a second number of radio frequency chains, a pair of arrival angles in a horizontal domain and a vertical domain for the user equipment. The second number is smaller than the first number.

As described above, in a wireless communication system including massive antennas and a smaller number of radio frequency chains, in order that the base station can accurately determine the pair of arrival angles in the horizontal domain and the vertical domain for the user equipment so as to implement the hybrid three-dimensional beamforming, the base station estimates a pair of coarse arrival angles for the user equipment based on the same number of antennas as the number of radio frequency chains and the radio frequency chains, determines pairs of candidate arrival angles based on the estimated pair of coarse arrival angles and beam widths, and then transmits an instruction to the user equipment so that the user equipment transmits a training signal, thus the base station may determine a pair of accurate arrival angles for the user equipment based on the training signal and the estimated pairs of candidate arrival angles. It should be understood that the training signal is known to the base station.

Preferably, the communication unit 902 may be further configured to transmit, in response to an instruction from the base station, a sounding reference signal for estimating an uplink equivalent channel to the base station. As described above, during uplink data reception, the base station transmits an instruction to the user equipment so that the user equipment transmits the sounding reference signal (SRS), thus the base station may estimate an uplink equivalent channel based on the received sounding reference signal and receive uplink data according to the estimated uplink equivalent channel. In the case of time division duplexing mode, the base station may also transmit downlink data according to the estimated uplink equivalent channel.

Figure 10:
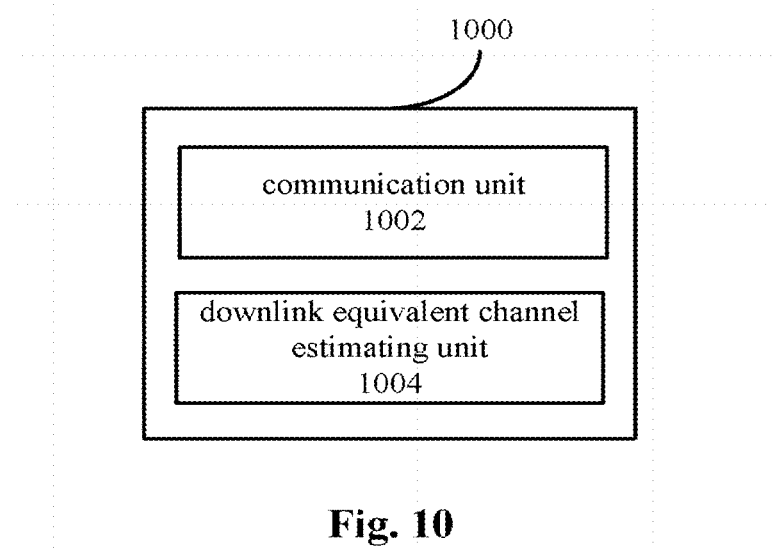
FIG. 10 is a block diagram showing another example of a functional configuration of an apparatus on a user equipment side in a wireless communication system according to an embodiment of the present disclosure.

Next, another example of a functional configuration of an apparatus on a user equipment side in a wireless communication system according to an embodiment of the present disclosure is described with reference to FIG. 10. FIG. 10 is a block diagram showing another example of a functional configuration of an apparatus on a user equipment side in a wireless communication system according to an embodiment of the present disclosure.

As shown in FIG. 10, an apparatus 1000 according to the example may include a communication unit 1002 and a downlink equivalent channel estimating unit 1004. An example of a functional configuration of the communication unit 1002 is substantially the same as that of the above-described communication unit 902, and is not described repeatedly here anymore. Only an example of a functional configuration of the downlink equivalent channel estimating unit 1004 is described in detail below.

The downlink equivalent channel estimating unit 1004 may be configured to estimate a downlink equivalent channel based on a reference signal from the base station so as to obtain channel status information, which information is used for the base station to transmit downlink data. The reference signal is transmitted by the base station based on the determined pair of arrival angles.

As described above, in the frequency division duplexing mode, since the uplink channel and the downlink channel are not reciprocal, it is required that the user equipment estimates a downlink equivalent channel and transmits the estimated downlink channel status information to the base station, so that the base station obtains a digital precoding vector for transmitting downlink data based on the fed back downlink channel status information. The processing of estimating the downlink equivalent channel is the same as that in the conventional technology, and is not described repeatedly herein anymore.

Preferably, the communication unit 1002 also transmits to the base station the channel status information obtained by the downlink equivalent channel estimating unit 1004, for the base station to transmit downlink data.

It should be noted that the above embodiments of the apparatus on the user equipment side correspond to the embodiments of the apparatus on the base station side described above with reference to FIG. 1 to FIG. 8. Thus, for contents which are not described in detail here, reference may be made to the description at corresponding positions in the above embodiments, which are not described repeatedly here anymore.

It should be understood that although the examples of the functional configurations of the apparatuses on the base station side and on the user equipment side have been described above with reference to the drawings, these are merely exemplary rather than restrictive, and those skilled in the art may also perform additions, deletions, combinations, sub-combinations or alternations on the functional modules in the above embodiments based on the principle of the present disclosure, and all of these variations should obviously fall within the scope of the present disclosure.

Figure 11:
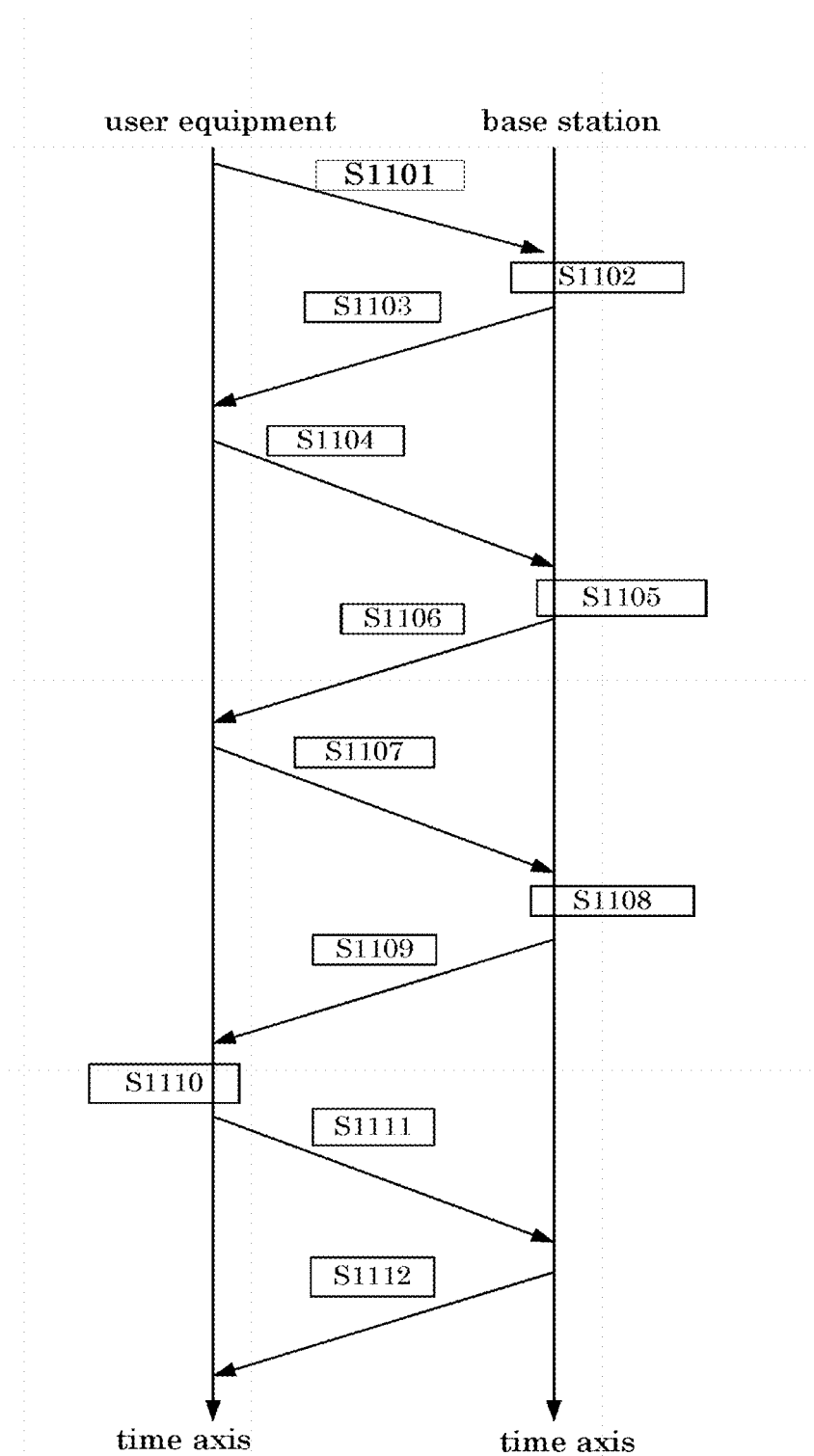
FIG. 11 is a flow chart showing a signaling interaction procedure in a wireless communication system according to an embodiment of the present disclosure.

In order to better understand the above process, a flow of signaling interaction between a base station and user equipment is described below with reference to FIG. 11. FIG. 11 is a flow chart showing a signaling interaction procedure in a wireless communication system according to an embodiment of the present disclosure.

As shown in FIG. 11, firstly, the user equipment transmits uplink data to the base station in step S1101. In step S1102, the base station selects, for a second number (for example, G) of radio frequency chains, G antennas from a first number (for example, T) of antennas to form a planar array, estimates a pair of coarse arrival angles based on the G antennas and the G radio frequency chains, and estimates pairs of candidate arrival angles based on the estimated pair of coarse arrival angles and beam widths. In step S1103, the base station transmits to the user equipment an instruction for transmitting a training signal. The base station may for example allocate q×q/G timeslots for the user equipment to transmit the training signal, where q denotes the number of candidate arrival angles in the horizontal domain or the vertical domain. In step S1104, the user equipment may transmit the training signal to the base station in response to the instruction from the base station. In step S1105, the base station may determine a pair of accurate arrival angles for the user equipment, that is, a beam direction for the user equipment, by the above-described search process based on the above-described pairs of candidate arrival angles and the training signal from the user equipment. In step S1106, the base station may transmit to the user equipment an instruction for transmitting a sounding reference signal for estimating an uplink equivalent channel. In step S1107, the user equipment transmits the sounding reference signal to the base station, and the sounding reference signals transmitted by different user equipment are orthogonal to each other. Then, in step S1108, the base station estimates the uplink equivalent channel based on the sounding reference signal from the user equipment, and receives uplink data according to the estimated uplink equivalent channel.

For the downlink data transmission, as described above, depending on whether the time division duplexing mode or the frequency division duplexing mode is used, there might be two cases. Specifically, in the case of time division duplexing mode, since the uplink channel and the downlink channel are reciprocal, in step S1109, the base station directly transmits downlink data to the user equipment according to the determined uplink equivalent channel and the analog beamforming vector (that is, a beam weight for the user equipment). On the other hand, in the case of frequency division duplexing mode, since the uplink channel and the downlink channel are not reciprocal, it is required for the user equipment to estimate a downlink equivalent channel. Specifically, in step S1109, the base station transmits to the user equipment a reference signal (for example, a CRS, a CSI-RS) for the user equipment to estimate the downlink equivalent channel. The user equipment estimates the downlink equivalent channel according to the received reference signal in step S1110, and feeds the estimated channel status information back to the base station in step S1111. Then, in step S1112, the base station determines a digital precoding vector for transmitting downlink data based on the received the channel status information, and transmits downlink data to the user equipment in combination with the above-described analog beamforming vector.

The flow of signaling interaction between the base station and the user equipment has been described above with reference to FIG. 11. However, it should be understood that this flow is merely exemplary rather than restrictive, and those skilled in the art may make appropriate modifications to the above flow based on the principle of the present disclosure, and such modifications should obviously fall within the scope of the present disclosure.

Corresponding to the above-described apparatus embodiments, the present disclosure further provides the following method embodiments. Methods on a base station side and on a user equipment side are described below respectively with reference to FIG. 12 and FIG. 13.

Figures 12, 13:
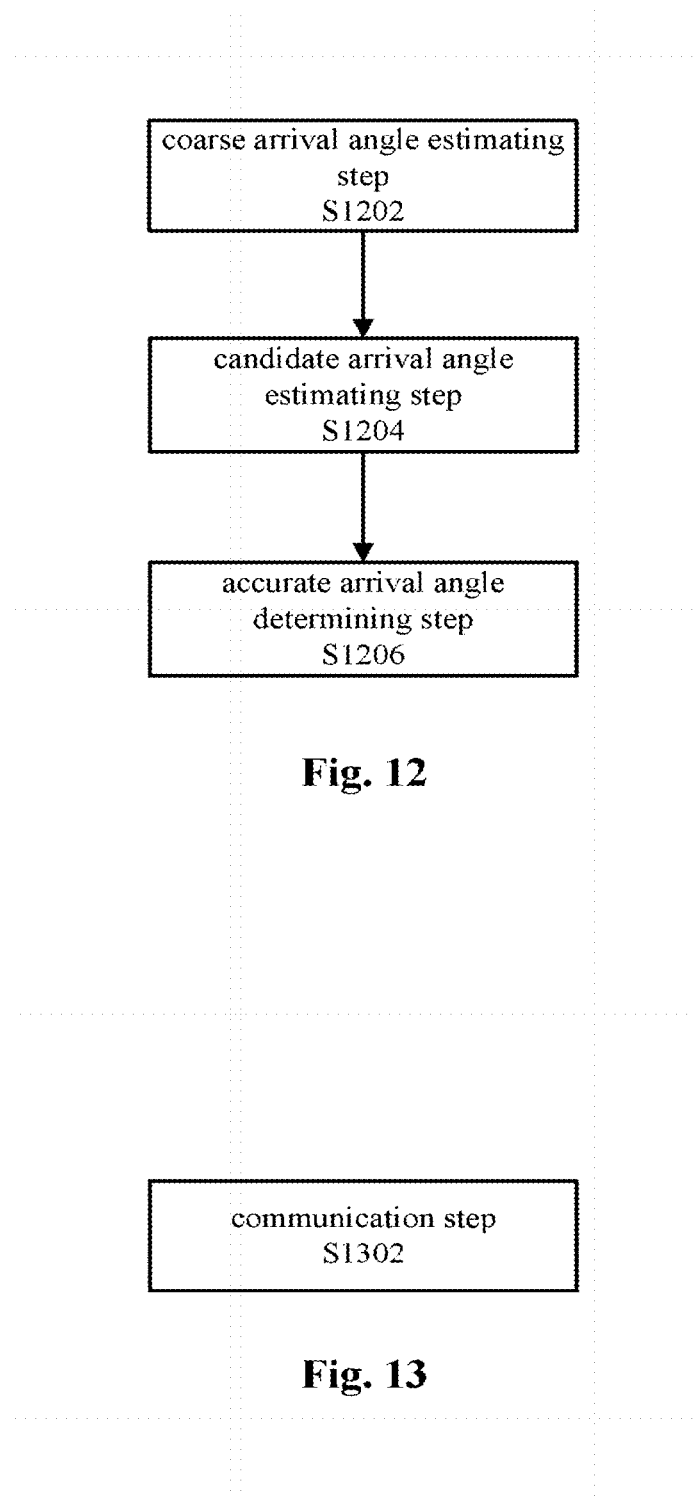
FIG. 12 is a flow chart showing a process example of a method on a base station side in a wireless communication system according to an embodiment of the present disclosure.
FIG. 13 is a flow chart showing a process example of a method on a user equipment side in a wireless communication system according to an embodiment of the present disclosure.

FIG. 12 is a flow chart showing a process example of a method on a base station side in a wireless communication system according to an embodiment of the present disclosure.

As shown in FIG. 12, a method 1200 according to the embodiment may include a coarse arrival angle estimating step S1202, a candidate arrival angle estimating step S1204, and an accurate arrival angle determining step S1206.

In the coarse arrival angle estimating step S1202, a pair of coarse arrival angles in a horizontal domain and a vertical domain is estimated based on a second number of antennas selected from a first number of antennas and the second number of radio frequency chains. The second number is smaller than the first number. Preferably, the pair of coarse arrival angles may be estimated with an MUSIC method or an ESPRIT method.

In the candidate arrival angle estimating step S1204, pairs of candidate arrival angles in the horizontal domain and the vertical domain are determined based on the estimated pair of coarse arrival angles, and beam widths in the horizontal domain and the vertical domain determined based on the first number of antennas and beam widths in the horizontal domain and the vertical domain determined based on the second number of antennas. Preferably, in the candidate arrival angle estimating step S1204, the number of pairs of candidate arrival angles may be determined based on the relationship between the beam widths in the horizontal domain and the vertical domain determined based on the first number of antennas and the beam widths in the horizontal domain and the vertical domain determined based on the second number of antennas, and the pairs of candidate arrival angles are determined based on the determined number by taking the pair of coarse arrival angles as a center, such that the determined number of pairs of candidate arrival angles are evenly distributed within a scope of the beam widths in the horizontal domain and the vertical domain determined based on the second number of antennas. Specifically, the pairs of candidate arrival angles may be determined according to, for example, the above expressions (1) to (4). The specific determining process may be referred to the above description at corresponding positions, and is not described repeatedly here anymore.

Next, in the accurate arrival angle determining step S1206, a difference between a projection component and a real component for each of the pairs of candidate arrival angles is calculated based on the training signal from the user equipment, and the pair of candidate arrival angles with the minimum calculated difference is determined as a pair of an accurate arrival angles in the horizontal domain and the vertical domain for the user equipment. The projection component is determined by projecting an actual received signal for the training signal of the base station onto a steering vector defined based on each of the pairs of candidate arrival angles, and the real component is determined based on the training signal and a status parameter of a channel between the base station and the user equipment. Preferably, the difference may represent a Euclidean distance between the projection component and the real component, and the status parameter of the channel may include a channel slow-varying characteristic parameter. As an exemplary implementation, the pair of accurate arrival angles may be determined by, for example, the process shown in the above expressions (5) to (9). The specific determining process may be referred to the above description at corresponding positions, and is not described here anymore.

Preferably, in the case of time division duplexing mode, the method 1200 may further include an analog beamforming vector generating step, a physical channel determining step and a digital precoding vector generating step.

In the analog beamforming vector generating step, an analog beamforming vector is generated based on the determined pair of accurate arrival angles.

In the physical channel determining step, a physical channel between the base station and the user equipment is determined based on the analog beamforming vector and an uplink equivalent channel estimated according to a sounding reference signal from the user equipment.

In the digital precoding vector generating step, a digital precoding vector is generated based on the analog beamforming vector, the physical channel and a predetermined reception rule.

On the other hand, in the case of frequency division duplexing mode, the method 1200 may further include an analog beamforming vector generating step and a digital precoding vector generating step.

In the analog beamforming vector generating step, an analog beamforming vector is generated based on the pair of accurate arrival angles and a carrier frequency.

In the digital precoding vector generating step, a digital precoding vector is generated based on channel status information fed back by the user equipment. The channel status information is obtained by performing, by the user equipment, downlink equivalent channel estimation according to a reference signal, which is transmitted by the base station based on the pair of accurate arrival angles.

Preferably, the above-described method 1200 may further include a communication step in which uplink data is received from the user equipment according to an uplink equivalent channel, and downlink data is transmitted to the user equipment according the analog beamforming vector and the digital precoding vector. Preferably, in the communication step, an instruction for transmitting a training signal or a sounding reference signal is also transmitted to the user equipment.

Furthermore, preferably, the method 1200 may further include a distance determining step for determining a distance from the base station to the user equipment based on the determined pair of accurate arrival angles.

It should be noted that the method embodiment described above with reference to FIG. 12 corresponds to the apparatus embodiment on the base station side described above with reference to FIG. 1 to FIG. 8, thus for contents which are not described in detail here, reference may be made to the above description at corresponding positions in the apparatus embodiment, which are not described repeatedly here anymore.

Next, a flow chart of a process example of a method on a user equipment side in a wireless communication system according to an embodiment of the present disclosure is described with reference to FIG. 13.

As shown in FIG. 13, a method 1300 according to the embodiment may include a communication step S1302, in which a training signal is transmitted to the base station according to an instruction from the base station, for the base station to determine, using a irst number of antennas and a second number of radio frequency chains, a pair of arrival angles in the horizontal domain and the vertical domain for the user equipment. The second number is smaller than the first number.

Preferably, in the communication step S1302, a sounding reference signal for uplink equivalent channel estimation is also transmitted to the base station according to an instruction from the base station.

In addition, preferably, in the frequency division duplexing mode, the method 1300 may further include a downlink equivalent channel estimating step, in which a downlink equivalent channel is estimated based on a reference signal from the base station, so as to obtain channel status information for the base station to transmit downlink data. The reference signal is transmitted by the base station based on the determined pair of accurate arrival angles, and the obtained channel status information is fed back to the base station in the communication step.

It should be noted that the method embodiment described above with reference to FIG. 13 corresponds to the apparatus embodiment on the user equipment side described above with reference to FIG. 9 to FIG. 10, thus for contents which are not described in detail here, reference may be made to the description at corresponding positions in the above apparatus embodiment, which are not described repeatedly here anymore.

It should be understood that although the process examples of the methods in the wireless communication system according to the embodiment of the present disclosure are described above, these are merely exemplary rather than restrictive, and those skilled in the art may also make modifications to the above embodiments based on the principle of the present disclosure. For example, additions, deletions, combinations and the like may be performed for the steps in the embodiments, and all of such modifications should fall within the scope of the present disclosure.

In addition, an electronic device is further provided according to an embodiment of the present disclosure, which may include a transceiver and at least one processor. The at least one processor may be configured to execute the methods or functions of the corresponding units in the wireless communication system according to the embodiments of the present disclosure described above.

It should be understood that machine-executable instructions in a storage medium and a program product according to an embodiment of the present disclosure may also be configured to execute the methods corresponding to the apparatus embodiments described above, thus for contents which are not described in detail here, reference may be made to the above description at the corresponding positions, which are not described repeatedly here anymore.

Accordingly, a storage medium on which the above program product storing the machine executable instructions is carried is also included in the present disclosure. The storage medium includes but is not limited to a floppy disk, an optical disk, a magneto-optical disk, a storage card, a memory rod and the like.

As can be seen from the above description, according to the technology in the present disclosure, a smaller number of radio frequency chains may be used to reduce the cost, and the pair of accurate arrival angles for the user equipment is determined in two steps to optimize the system performance. In the following, improvement of the system performance (for example, an achievable data rate of the system) obtained by applying the technology in the present disclosure under various exemplary conditions is described with reference to FIG. 14 to FIG. 16.

It is assumed that there are two user equipment in a cell, each of the user equipment is provided with one antenna, and the base station is provided with T=100 antennas and G=4 radio frequency chains. Horizontal arrival angles and vertical arrival angles of Line of Sight components of the two user equipment are respectively represented as (φ1, θ1)=[30°, 45°], (φ2, θ2)=[35°, 50°], which means that the two user equipment are close to each other. The large-scale fading coefficients for the two user equipment are 0.8 and 0.3, respectively. In the simulation, downlink transmission performance in the time division duplexing mode is provided in this example, and the signal to noise ratio (SNR) is defined as a ratio of transmission power of the base station to Gaussian noise power.

Figure 14:
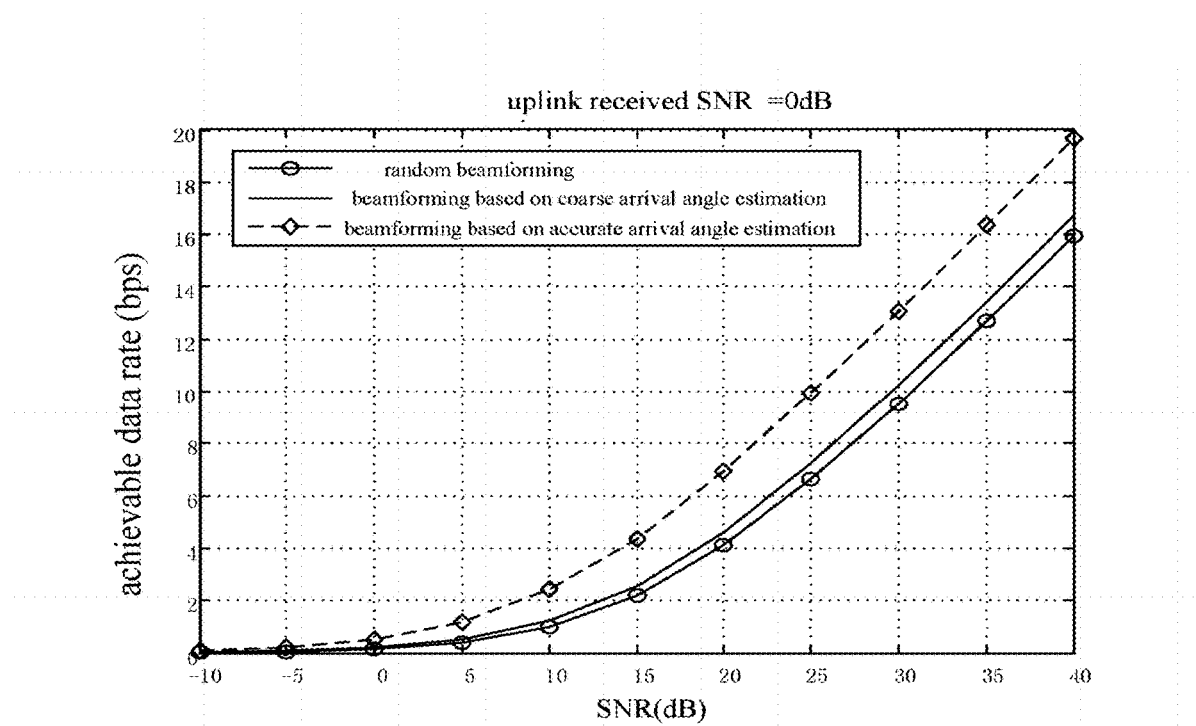
FIG. 14 is a schematic diagram showing a simulation of an achievable data rate of a system to which the technology of the present disclosure is applied under a first exemplary condition.

FIG. 14 is a schematic diagram showing a simulation of an achievable data rate of a system to which the technology of the present disclosure is applied under a first exemplary condition.

In the example shown in FIG. 14, it shows an achievable data rate in this method in a case where a K factor of the Rician channel is 0 dB and an uplink signal to noise ratio for arrival angle estimation is 0 dB. Under this condition, coarse arrival angle estimation is inaccurate. Therefore, it can be seen from FIG. 14 that a gap between an achievable data rate of beamforming based on the coarse arrival angle estimation and an achievable data rate of random beamforming is small.

In the case of a specific SNR, performance based on accurate arrival angle estimation (two-step beamforming in this method) is improved by about 2 bps.

Figure 15:
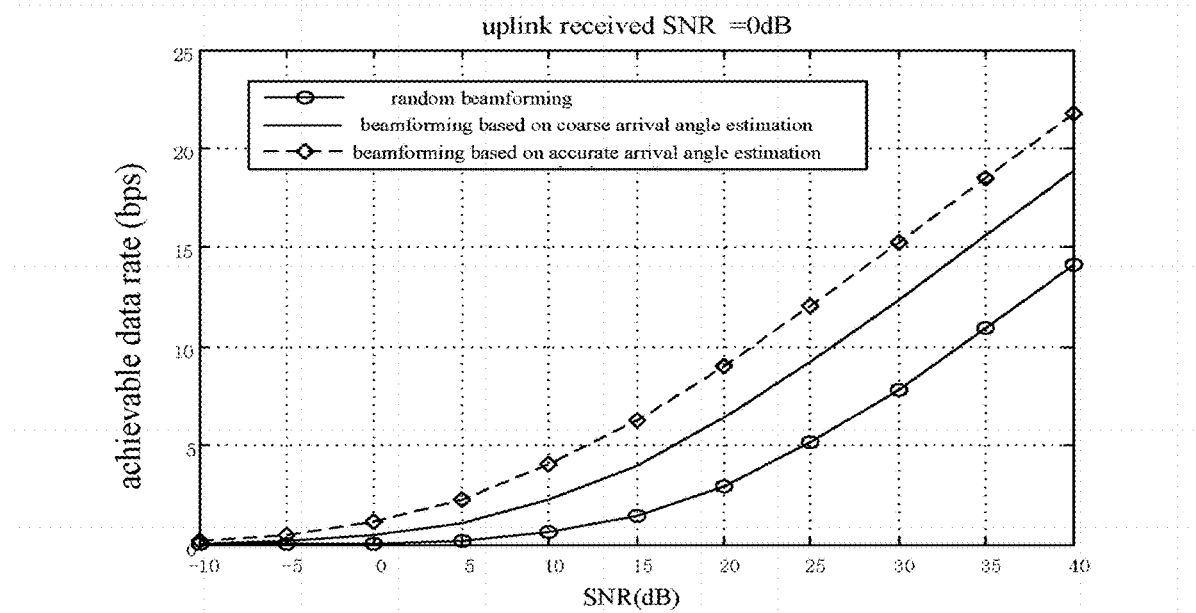
FIG. 15 is a schematic diagram showing a simulation of an achievable data rate of a system to which the technology of the present disclosure is applied under a second exemplary condition.

FIG. 15 is a schematic diagram showing a simulation of an achievable data rate of a system to which the technology of the present disclosure is applied under a second exemplary condition.

In the example shown in FIG. 15, it shows an achievable data rate in this method in a case where the K factor of the Rician channel is 5 dB and the uplink signal to noise ratio for arrival angle estimation is 0 dB. Under this condition, the Line of Sight component becomes large, and therefore, coarse arrival angle estimation becomes relatively accurate (compared with the case in FIG. 14). It can be seen from FIG. 15 that a gap between the achievable data rate of the beamforming based on the coarse arrival angle estimation and the achievable data rate of the random beamforming becomes large, and the performance based on the accurate arrival angle estimation is optimum.

Figure 16:
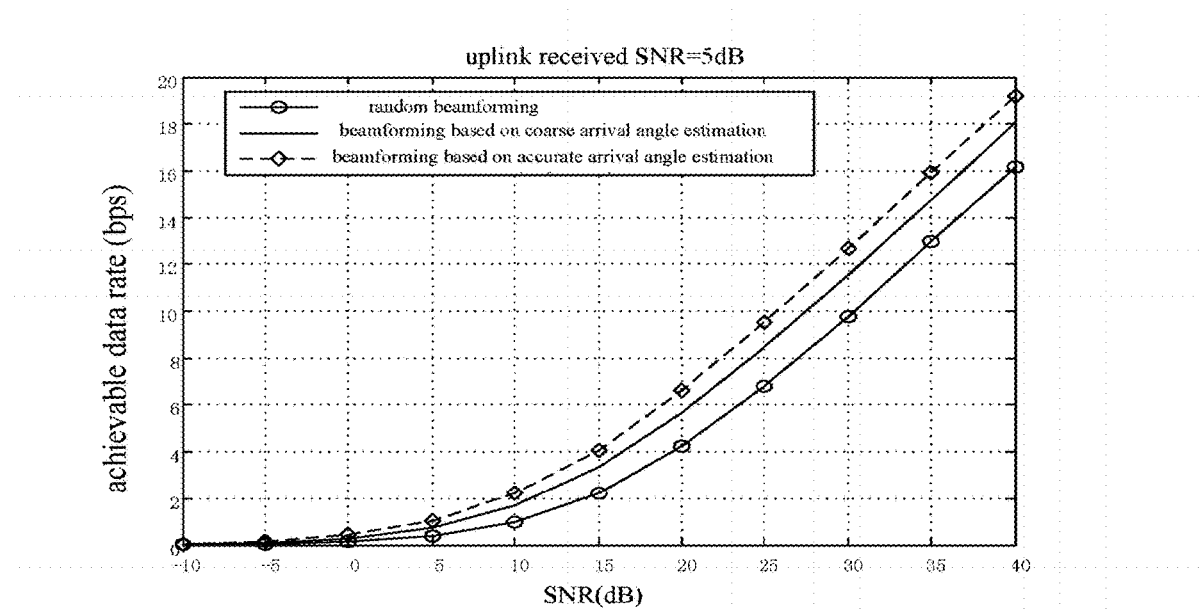
FIG. 16 is a schematic diagram showing a simulation of an achievable data rate of a system to which the technology of the present disclosure is applied under a third exemplary condition.

FIG. 16 is a schematic diagram showing a simulation of an achievable data rate of a system to which the technology of the present disclosure is applied under a third exemplary condition.

In the example shown in FIG. 16, it shows an achievable data rate in this method in a case where the K factor of the Rician channel is 0 dB and the uplink signal to noise ratio for arrival angle estimation is 5 dB. Under this condition, since the signal to noise ratio is improved during the arrival angle estimation (compared with the case in FIG. 14), accuracy of the coarse arrival angle estimation is improved. As compared with the case in FIG. 14, a physical channel condition in FIG. 16 is the same as that in FIG. 14. The achievable data rate of the beamforming method based on the coarse arrival angle estimation is improved. Likewise, the achievable data rate based on the accurate arrival angle estimation is optimum.

Figure 17:
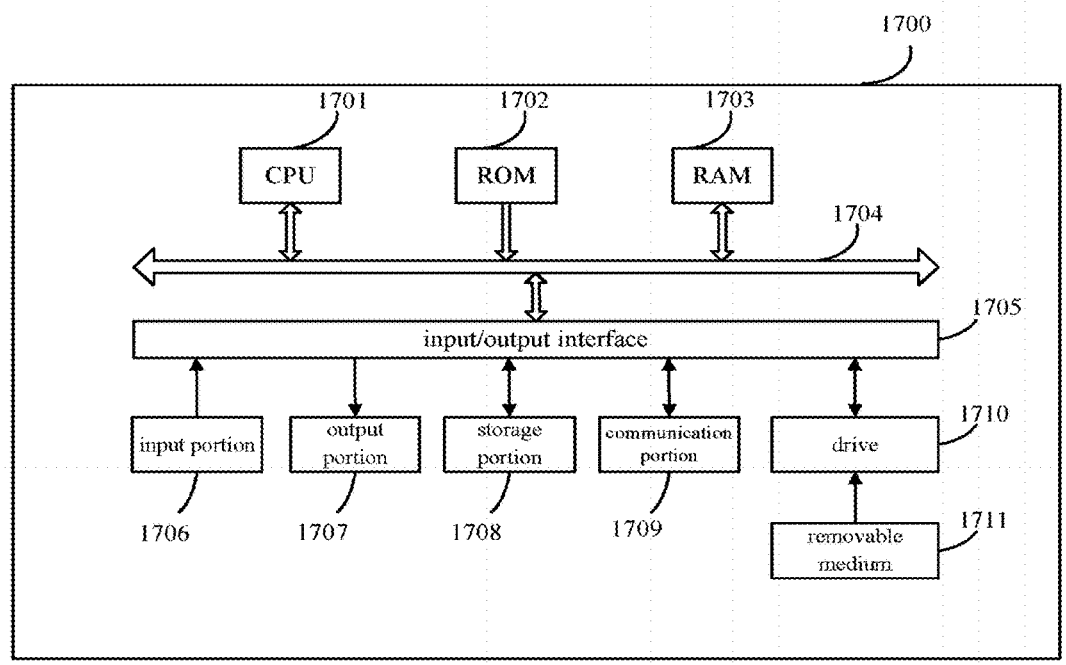
FIG. 17 is a block diagram showing an exemplary structure of a personal computer as an information processing device that may be adopted in an embodiment of the present disclosure.

Furthermore, it shall be noted that the above-described series of processing and apparatuses can also be implemented with software and/or firmware. In the case of being implemented with software and/or firmware, a program constituting the software is installed from a storage medium or a network to a computer with a dedicated hardware structure, such as a general purpose personal computer 1700 shown in FIG. 17, which can perform various functions when various programs are installed thereon. FIG. 17 is a block diagram showing an exemplary structure of a personal computer as an information processing device that may be adopted in an embodiment of the present disclosure.

In FIG. 17, a Central Processing Unit (CPU) 1701 performs various processes according to a program stored in a Read Only Memory (ROM) 1702 or loaded from a storage portion 1708 into a Random Access Memory (RAM) 1703 in which data required when the CPU 1701 performs the various processes is also stored as needed.

The CPU 1701, the ROM 1702 and the RAM 1703 are connected to each other via a bus 1704 to which an input/output interface 1705 is also connected.

The following components are connected to the input/output interface 1705: an input portion 1706 including a keyboard, a mouse, etc.; an output portion 1707 including a display, e.g., a Cathode Ray Tube (CRT), a Liquid Crystal Display (LCD), etc., a speaker, etc.; a storage portion 1708 including a hard disk, etc.; and a communication portion 1709 including a network interface card, e.g., an LAN card, a modem, etc. The communication portion 1709 performs a communication process over a network, e.g., the Internet.

A drive 1710 is also connected to the input/output interface 1705 as needed. A removable medium 1711, e.g., a magnetic disk, an optical disk, an magneto optical disk, a semiconductor memory, etc., can be installed on the drive 1710 as needed so that a computer program fetched therefrom can be installed into the storage portion 1708 as needed.

In the case that the foregoing series of processing are performed in software, a program constituting the software is installed from a network, e.g., the Internet, etc., or a storage medium, e.g., the removable medium 1711, etc.

Those skilled in the art shall appreciate that such a storage medium will not be limited to the removable medium 1711 illustrated in FIG. 17 in which the program is stored and which is distributed separately from the apparatus to provide a user with the program. Examples of the removable medium 1711 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1702, a hard disk included in the storage portion 1708, etc., in which the program is stored and which is distributed together with the apparatus including the same to the user.

Application examples according to the present disclosure are described below with reference to FIG. 18 to FIG. 21.

Application Example Regarding Base Station

First Application Example

Figure 18:
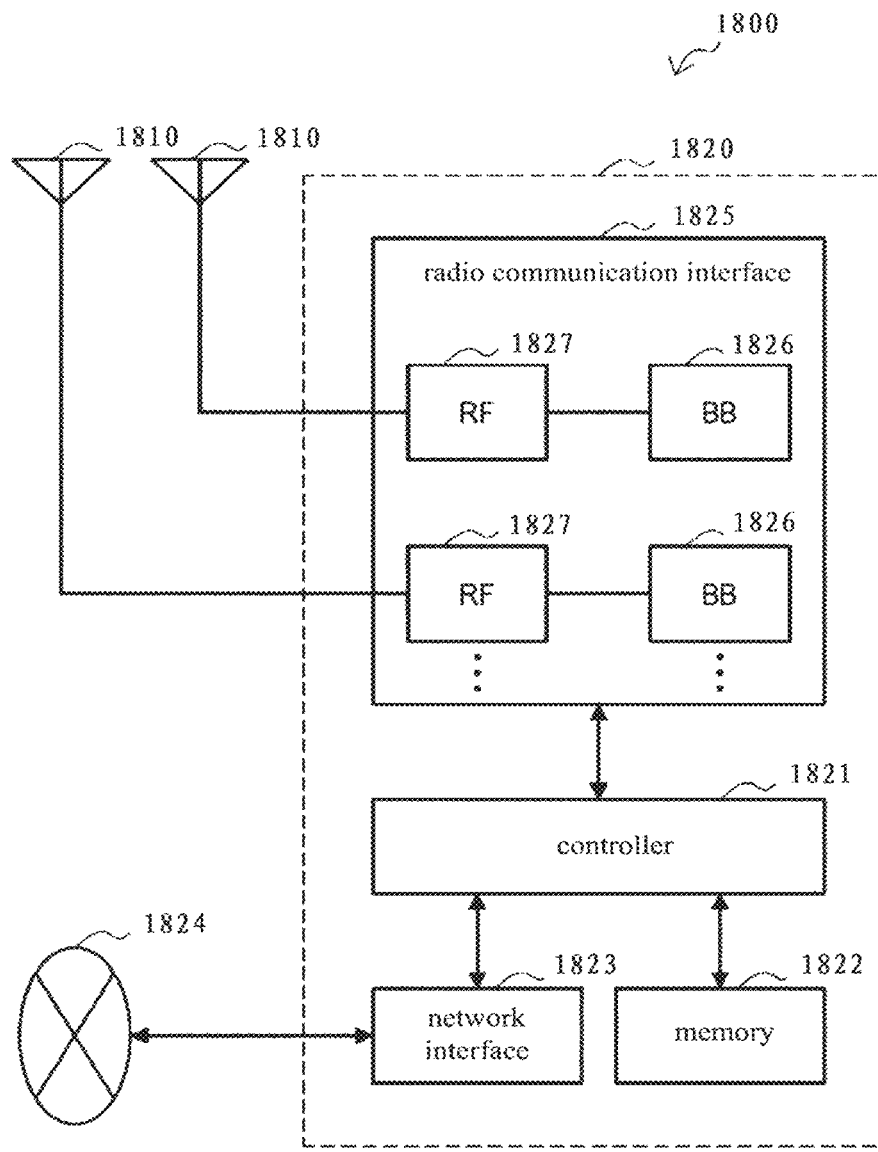
FIG. 18 is a block diagram showing a first example of a schematic configuration of an evolved node (eNB) to which the technology of the present disclosure may be applied.

FIG. 18 is a block diagram showing a first example of a schematic configuration of an eNB to which the technology in the present disclosure may be applied. An eNB 1800 includes one or more antennas 1810 and a base station apparatus 1820. The base station apparatus 1820 and each of the antennas 1810 may be connected to each other via an RF cable.

Each of the antennas 1810 includes a single or multiple antenna elements (such as multiple antenna elements included in a multiple-input multiple-output (MIMO) antenna), and is used for the base station apparatus 1820 to transmit and receive radio signals. As shown in FIG. 18, the eNB 1800 may include multiple antennas 1810. For example, multiple antennas 1810 may be compatible with multiple frequency bands used by the eNB 1800. Although FIG. 18 illustrates an example in which the eNB 1800 includes multiple antennas 1810, the eNB 1800 may also include a single antenna 1810.

The base station apparatus 1820 includes a controller 1821, a memory 1822, a network interface 1823, and a radio communication interface 1825.

The controller 1821 may be, for example, a CPU or a DSP, and operates various functions of a higher layer of the base station apparatus 1820. For example, the controller 1821 generates a data packet from data in signals processed by the radio communication interface 1825 and transfers the generated packet via the network interface 1823. The controller 1821 may bundle data from multiple baseband processors to generate the bundled packet and transfer the generated bundled packet. The controller 1821 may have logical functions of performing control such as radio resource control, radio bearer control, mobility management, admission control, and scheduling. The control may be performed in cooperation with an eNB or a core network node in the vicinity. The memory 1822 includes a RAM and a ROM, and stores the program executed by the controller 1821 and various types of control data (such as a terminal list, transmission power data, and scheduling data).

The network interface 1823 is a communication interface for connecting the base station apparatus 1820 to a core network 1824. The controller 1821 may communicate with a core network node or another eNB via the network interface 1823. In this case, the eNB 1800, and the core network node or the other eNB may be connected to each other through a logical interface (such as an S1 interface and an X2 interface). The network interface 1823 may also be a wired communication interface or a radio communication interface for radio backhaul. If the network interface 1823 is a radio communication interface, the network interface 1823 may use a higher frequency band for the radio communication than a frequency band used by the radio communication interface 1825.

The radio communication interface 1825 supports any cellular communication scheme (such as Long Term Evolution (LTE) and LTE-Advanced), and provides radio connection to a terminal located in a cell of the eNB 1800 via the antenna 1810. The radio communication interface 1825 may typically include, for example, a baseband (BB) processor 1826 and an RF circuit 1827. The BB processor 1826 may perform, for example, encoding/decoding, modulating/demodulating, and multiplexing/demultiplexing, and performs various types of signal processing of layers (e.g., L1, medium access control (MAC), radio link control (RLC) and a packet data convergence protocol (PDCP)). The BB processor 1826 may have a part or all of the logical functions described above instead of the controller 1821. The BB processor 1826 may be a memory that stores a communication control program, or a module including a processor and a related circuit configured to execute the program. Updating the program may allow the functions of the BB processor 1826 to be changed. The module may be a card or a blade inserted into a slot of the base station apparatus 1820. Alternatively, the module may also be a chip mounted on the card or the blade. Meanwhile, the RF circuit 1827 may include, for example, a mixer, a filter, and an amplifier, and transmits and receives radio signals via the antenna 1810.

As shown in FIG. 18, the radio communication interface 1825 may include multiple BB processors 1826. For example, the multiple BB processors 1826 may be compatible with multiple frequency bands used by the eNB 1800. As shown in FIG. 18, the radio communication interface 1825 may include multiple RF circuits 1827. For example, the multiple RF circuits 1827 may be compatible with multiple antenna elements. Although FIG. 18 illustrates an example that the radio communication interface 1825 includes multiple BB processors 1826 and multiple RF circuits 1827, the radio communication interface 1825 may also include a single BB processor 1826 or a single RF circuit 1827.

Second Application Example

Figure 19:
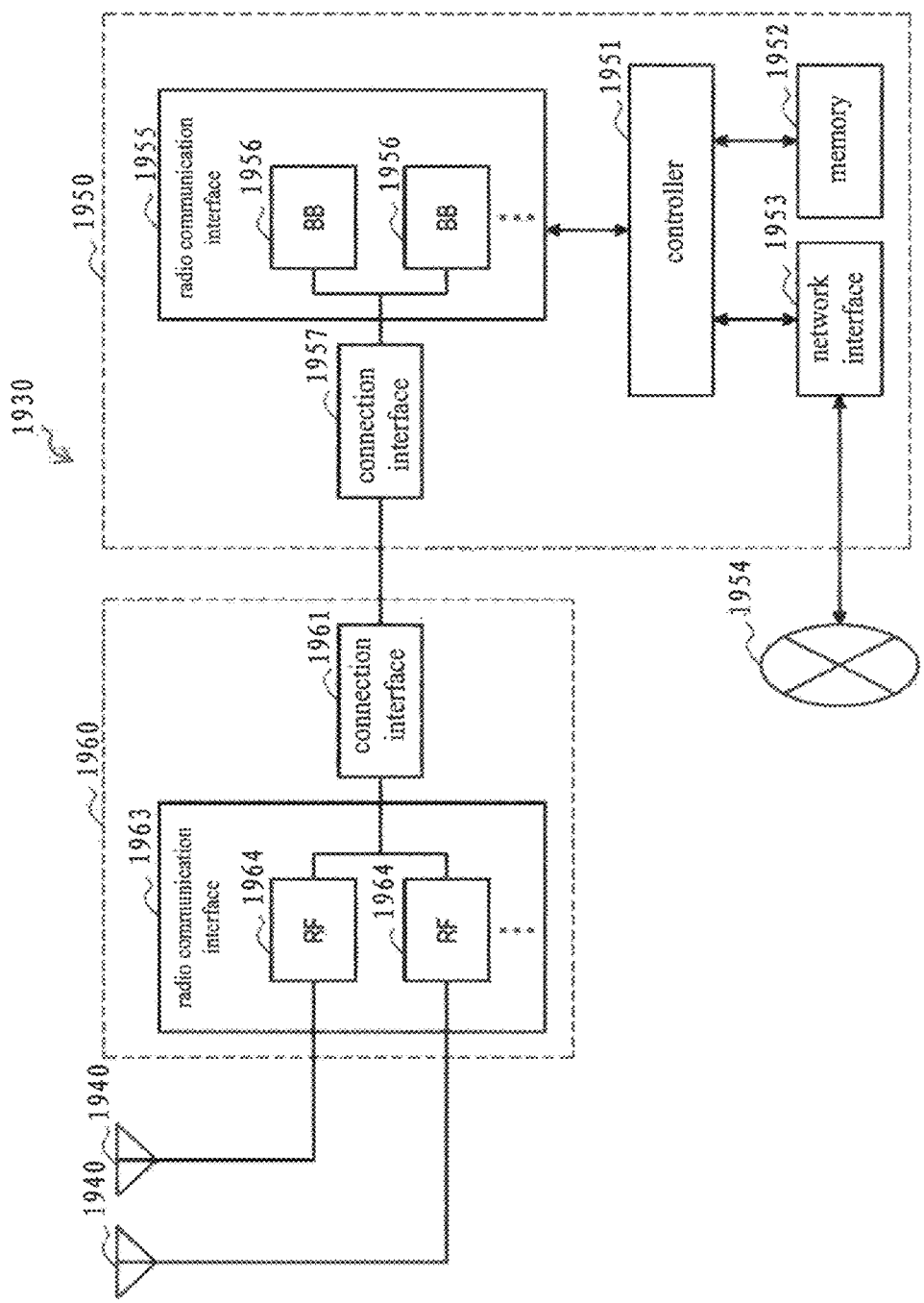
FIG. 19 is a block diagram showing a second example of a schematic configuration of an eNB to which the technology of the present disclosure may be applied.

FIG. 19 is a block diagram showing a second example of a schematic configuration of an eNB to which the technology in the present disclosure may be applied. The eNB 1930 includes one or more antennas 1940, a base station apparatus 1950 and an RRH 1960. The RRH 1960 and each of the antennas 1940 may be connected to each other via an RF cable. The base station apparatus 1950 and the RRH 1960 may be connected to each other via a high speed line such as an optical fiber cable.

Each of the antennas 1940 includes a single or multiple antenna elements (such as multiple antenna elements included in an MIMO antenna), and is used for the RRH 1960 to transmit and receive radio signals. As shown in FIG. 19, the eNB 1930 may include multiple antennas 1940. For example, the multiple antennas 1940 may be compatible with multiple frequency bands used by the eNB 1930. Although FIG. 19 illustrates an example in which the eNB 1930 includes multiple antennas 1940, the eNB 1930 may also include a single antenna 1940.

The base station apparatus 1950 includes a controller 1951, a memory 1952, a network interface 1953, a radio communication interface 1955, and a connection interface 1957. The controller 1951, the memory 1952, and the network interface 1953 are the same as the controller 1821, the memory 1822, and the network interface 1823 described with reference to FIG. 18.

The radio communication interface 1955 supports any cellular communication scheme (such as LTE and LTE-Advanced) and provides radio communication to a terminal located in a sector corresponding to the RRH 1960 via the RRH 1960 and the antenna 1940. The radio communication interface 1955 may typically include, for example, a BB processor 1956. The BB processor 1956 is the same as the BB processor 1826 described with reference to FIG. 18 except that the BB processor 1956 is connected to the RF circuit 1964 of the RRH 1960 via the connection interface 1957. As shown in FIG. 19, the radio communication interface 1955 may include multiple BB processors 1956. For example, the multiple BB processors 1956 may be compatible with multiple frequency bands used by the eNB 1930. Although FIG. 19 illustrates an example in which the radio communication interface 1955 includes multiple BB processors 1956, the radio communication interface 1955 may also include a single BB processor 1956.

The connection interface 1957 is an interface for connecting the base station apparatus 1950 (the radio communication interface 1955) to the RRH 1960. The connection interface 1957 may also be a communication module for communication in the above-described high speed line for connecting the base station apparatus 1950 (the radio communication interface 1955) to the RRH 1960.

The RRH 1960 includes a connection interface 1961 and a radio communication interface 1963.

The connection interface 1961 is an interface for connecting the RRH 1960 (the radio communication interface 1963) to the base station apparatus 1950. The connection interface 1961 may also be a communication module for communication in the above-described high speed line.

The radio communication interface 1963 transmits and receives radio signals via the antenna 1940. The radio communication interface 1963 may typically include, for example, the RF circuit 1964. The RF circuit 1964 may include, for example, a mixer, a filter, and an amplifier, and transmits and receives radio signals via the antenna 1940. As shown in FIG. 19, the radio communication interface 1963 may include multiple RF circuits 1964. For example, the multiple RF circuits 1964 may support multiple antenna elements. Although FIG. 19 illustrates an example in which the radio communication interface 1963 includes multiple RF circuits 1964, the radio communication interface 1963 may also include a single RF circuit 1964.

In the eNB 1800 shown in FIG. 18 and the eNB 1930 shown in FIG. 19, the communication units in the apparatuses 300 and 600 to 800 may be implemented by the radio communication interface 1825 and the radio communication interface 1955 and/or the radio communication interface 1963. At least part of the functions of the coarse arrival angle estimating unit, the candidate arrival angle estimating unit, the accurate arrival angle determining unit, the analog beamforming vector generating unit, the physical channel determining unit, the digital precoding vector generating unit and the distance determining unit may also be realized by the controller 1821 and the controller 1951.

Application Example Regarding User Equipment

First Application Example

Figure 20:
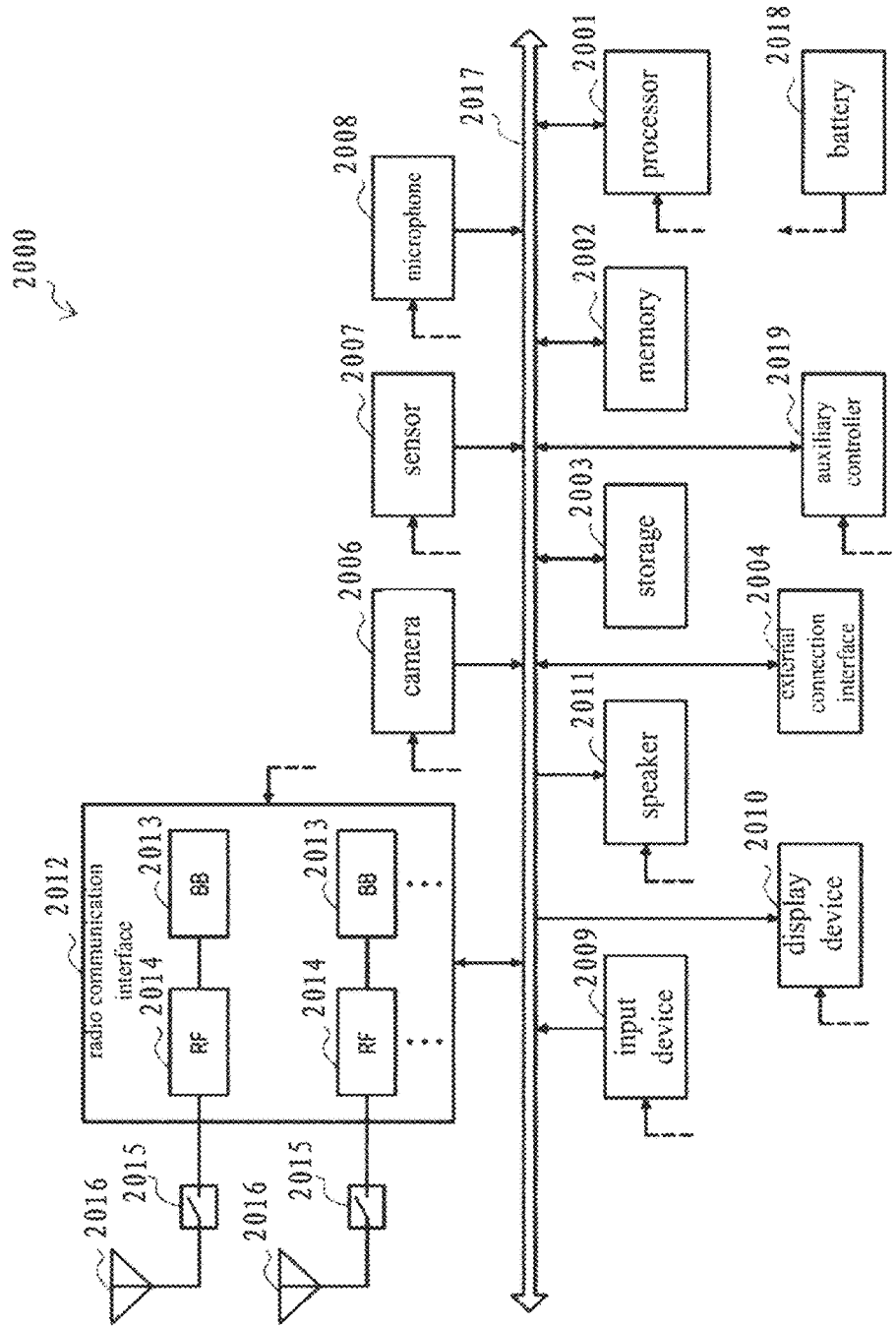
FIG. 20 is a block diagram showing an example of a schematic configuration of a smartphone to which the technology of the present disclosure may be applied.

FIG. 20 is a block diagram showing an example of a schematic configuration of a smartphone 2000 to which the technology of the present disclosure may be applied. The smartphone 2000 includes a processor 2001, a memory 2002, a storage 2003, an external connection interface 2004, a camera 2006, a sensor 2007, a microphone 2008, an input device 2009, a display device 2010, a speaker 2011, a radio communication interface 2012, one or more antenna switches 2015, one or more antennas 2016, a bus 2017, a battery 2018, and an auxiliary controller 2019.

The processor 2001 may be, for example, a CPU or a system-on-chip (SoC), and controls functions of an application layer and other layers of the smartphone 2000. The memory 2002 includes RAM and ROM, and stores a program executed by the processor 2001 and data. The storage 2003 may include a storage medium, such as a semiconductor memory and a hard disk. The external connection interface 2004 is an interface for connecting an external device (such as a memory card and a universal serial bus (USB) device) to the smartphone 2000.

The camera 2006 includes an image sensor (such as a charge coupled device (CCD) and a complementary metal oxide semiconductor (CMOS)), and generates a captured image. The sensor 2007 may include a group of sensors, such as a measurement sensor, a gyro sensor, a geomagnetic sensor, and an acceleration sensor. The microphone 2008 converts sounds that are input to the smartphone 2000 into audio signals. The input device 2009 includes, for example, a touch sensor configured to detect touch onto a screen of the display device 2010, a keypad, a keyboard, a button or a switch, and receives an operation or information input from a user. The display device 2010 includes a screen (such as a liquid crystal display (LCD) and an organic light emitting diode (OLED) display), and displays an output image of the smartphone 2000. The speaker 2011 converts audio signals output from the smartphone 2000 to sounds.

The radio communication interface 2012 supports any cellular communication scheme (such as LTE and LTE-Advanced), and performs radio communication. The radio communication interface 2012 may typically include, for example, a BB processor 2013 and an RF circuit 2014. The BB processor 2013 may perform, for example, encoding/decoding, modulating/demodulating, and multiplexing/demultiplexing, and performs various types of signal processing for radio communication. Meanwhile, the RF circuit 2014 may include, for example, a mixer, a filter, and an amplifier, and transmits and receives radio signals via the antenna 2016. The radio communication interface 2012 may be a one chip module having the BB processor 2013 and the RF circuit 2014 integrated thereon. As shown in FIG. 20, the radio communication interface 2012 may include multiple BB processors 2013 and multiple RF circuits 2014. Although FIG. 20 illustrates the example in which the radio communication interface 2012 includes multiple BB processors 2013 and multiple RF circuits 2014, the radio communication interface 2012 may also include a single BB processor 2013 or a single RF circuit 2014.

Furthermore, in addition to a cellular communication scheme, the radio communication interface 2012 may support another type of radio communication scheme such as a short-distance wireless communication scheme, a near field communication scheme, and a radio local area network (LAN) scheme. In this case, the radio communication interface 2012 may include the BB processor 2013 and the RF circuit 2014 for each radio communication scheme.

Each of the antenna switches 2015 switches connection destinations of the antenna 2016 among multiple circuits (such as circuits for different radio communication schemes) included in the radio communication interface 2012.

Each of the antennas 2016 includes a single or multiple antenna elements (such as multiple antenna elements included in an MIMO antenna), and is used for the radio communication interface 2012 to transmit and receive radio signals. As shown in FIG. 20, the smartphone 2000 may include multiple antennas 2016. Although FIG. 20 illustrates the example in which the smartphone 2000 includes multiple antennas 2016, the smartphone 2000 may also include a single antenna 2016.

In addition, the smartphone 2000 may include the antenna 2016 for each radio communication scheme. In this case, the antenna switches 2015 may be omitted from the configuration of the smartphone 2000.

The bus 2017 connects the processor 2001, the memory 2002, the storage 2003, the external connection interface 2004, the camera 2006, the sensor 2007, the microphone 2008, the input device 2009, the display device 2010, the speaker 2011, the radio communication interface 2012, and the auxiliary controller 2019 with each other. The battery 2018 supplies power to the blocks of the smartphone 2000 shown in FIG. 20 via feeder lines, which are partially shown as dashed lines in the figure. The auxiliary controller 2019 operates a minimum necessary function of the smartphone 2000, for example, in a sleep mode.

In the smartphone 2000 shown in FIG. 20, the communication unit in the apparatuses 900 and 1000 described above may be implemented by the radio communication interface 2012. At least a part of the functions of the downlink equivalent channel estimating unit may also be implemented by the processor 2001 or the auxiliary controller 2019.

Second Application Example

Figure 21:
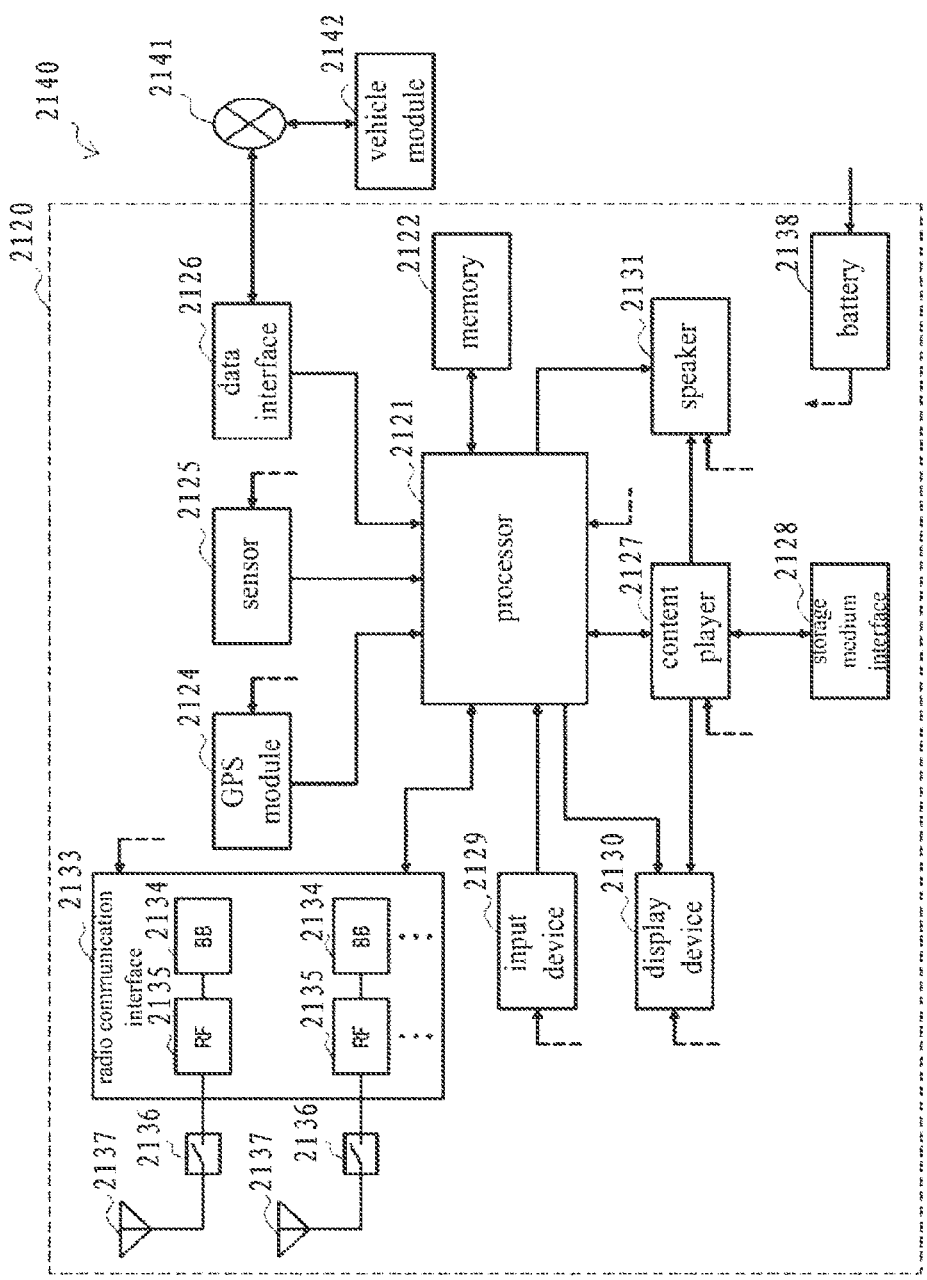
FIG. 21 is a block diagram showing an example of a schematic configuration of a car navigation apparatus to which the technology of the present disclosure may be applied.

FIG. 21 is a block diagram showing an example of a schematic configuration of a car navigation apparatus 2120 to which the technology of the present disclosure may be applied. The car navigation apparatus 2120 includes a processor 2121, a memory 2122, a global positioning system (GPS) module 2124, a sensor 2125, a data interface 2126, a content player 2127, a storage medium interface 2128, an input device 2129, a display device 2130, a speaker 2131, a radio communication interface 2133, one or more antenna switches 2136, one or more antennas 2137, and a battery 2138.

The processor 2121 may be, for example, a CPU or an SoC, and controls a navigation function and other functions of the car navigation apparatus 2120. The memory 2122 includes RAM and ROM, and stores a program executed by the processor 2121 and data.

The GPS module 2124 uses GPS signals received from a GPS satellite to measure a position (such as latitude, longitude, and altitude) of the car navigation apparatus 2120. The sensor 2125 may include a group of sensors, such as a gyro sensor, a geomagnetic sensor, and an air pressure sensor. The data interface 2126 is connected to, for example, an in-vehicle network 2141 via a terminal not shown, and acquires data generated by the vehicle (such as vehicle speed data).

The content player 2127 reproduces content stored in a storage medium (such as a CD and a DVD) that is inserted into the storage medium interface 2128. The input device 2129 includes, for example, a touch sensor configured to detect touch onto a screen of the display device 2130, a button or a switch, and receives an operation or information input from a user. The display device 2130 includes a screen such as an LCD display or an OLED display, and displays an image of the navigation function or content that is reproduced. The speaker 2131 outputs sounds of the navigation function or the content that is reproduced.

The radio communication interface 2133 supports any cellular communication scheme (such as LTE and LTE-Advanced), and performs radio communication. The radio communication interface 2133 may typically include, for example, a BB processor 2134 and an RF circuit 2135. The BB processor 2134 may perform, for example, encoding/decoding, modulating/demodulating, and multiplexing/demultiplexing, and performs various types of signal processing for radio communication. Meanwhile, the RF circuit 2135 may include, for example, a mixer, a filter, and an amplifier, and transmits and receives radio signals via the antenna 2137. The radio communication interface 2133 may also be a one chip module on which the BB processor 2134 and the RF circuit 2135 are integrated. As shown in FIG. 21, the radio communication interface 2133 may include multiple BB processors 2134 and multiple RF circuits 2135. Although FIG. 21 shows the example in which the radio communication interface 2133 includes multiple BB processors 2134 and multiple RF circuits 2135, the radio communication interface 2133 may also include a single BB processor 2134 or a single RF circuit 2135.

Furthermore, in addition to a cellular communication scheme, the radio communication interface 2133 may support another type of radio communication scheme such as a short-distance wireless communication scheme, a near field communication scheme, and a radio LAN scheme. In this case, the radio communication interface 2133 may include the BB processor 2134 and the RF circuit 2135 for each radio communication scheme.

Each of the antenna switches 2136 switches connection destinations of the antenna 2137 among multiple circuits (such as circuits for different radio communication schemes) included in the radio communication interface 2133.

Each of the antennas 2137 includes a single or multiple antenna elements (such as multiple antenna elements included in an MIMO antenna), and is used for the radio communication interface 2133 to transmit and receive radio signals. As shown in FIG. 21, the car navigation apparatus 2120 may include multiple antennas 2137. Although FIG. 21 shows the example in which the car navigation apparatus 2120 includes multiple antennas 2137, the car navigation apparatus 2120 may also include a single antenna 2137.

In addition, the car navigation apparatus 2120 may include the antenna 2137 for each radio communication scheme. In this case, the antenna switches 2136 may be omitted from the configuration of the car navigation apparatus 2120.

The battery 2138 supplies power to blocks of the car navigation apparatus 2120 shown in FIG. 21 via feeder lines that are partially shown as dashed lines in the figure. The battery 2138 accumulates power supplied from the vehicle.

In the car navigation apparatus 2120 shown in FIG. 21, the communication units in the apparatuses 900 and 1000 may be implemented by the radio communication interface 2133. At least a part of functions of the downlink equivalent channel estimating unit may also be implemented by the processor 2121.

The technology of the present disclosure may also be implemented as an in-vehicle system (or a vehicle) 2140 including one or more blocks of the car navigation apparatus 2120, the in-vehicle network 2141 and a vehicle module 2142. The vehicle module 2142 generates vehicle data (such as a vehicle speed, an engine speed, and trouble information), and outputs the generated data to the in-vehicle network 2141.

The preferred embodiments of the present disclosure have been described above with reference to the drawings, but the present disclosure is not limited to the above examples of course. Those skilled in the art may devise various alternations and modifications within the scope of the appended claims, and it should be understood that these alternations and modifications would naturally fall within the technical scope of the present disclosure.

For example, multiple functions included in one unit in the above embodiments may be implemented by separated devices. Alternatively, multiple functions realized by multiple units in the above embodiments may be implemented by separated devices respectively. Furthermore, one of the above functions may be realized by multiple units. Without saying, such configuration is included in the technical scope of the present disclosure.

In this specification, the steps described in the flow charts include not only processes performed in the sequential order as described chronically, but also processes performed concurrently or separately but not necessarily chronically. Further, even in the steps processed chronically, without saying, the order can be appropriately changed.

The invention claimed is:

1. An apparatus on a base station side in a wireless communication system, wherein the base station is provided with a first number of antennas and a second number of radio frequency chains, the second number being smaller than the first number, the apparatus comprising processing circuitry configured to:
   estimate a pair of coarse arrival angles in a horizontal domain and a vertical domain based on the second number of antennas selected from the first number of antennas and the second number of radio frequency chains;
   determine pairs of candidate arrival angles in the horizontal domain and the vertical domain based on the estimated pair of coarse arrival angles and beam widths in the horizontal domain and the vertical domain determined based on the first number of antennas and the second number of antennas respectively; and
   calculate, according to a training signal from user equipment, a difference between a projection component and a real component for each of the pairs of candidate arrival angles, and to determine the pair of candidate arrival angles with a minimum calculated difference as a pair of accurate arrival angles in the horizontal domain and the vertical domain for the user equipment, wherein the projection component is determined by projecting an actual received signal for the training signal of the base station onto a steering vector defined based on each of the pairs of candidate arrival angles, and the real component is determined based on the training signal and a status parameter of a channel between the base station and the user equipment.

2. The apparatus according to claim 1, wherein the first number of antennas form a two-dimensional planar antenna array, and the second number of antennas form a sub array selected from the two-dimensional planar antenna array.

3. The apparatus according to claim 1, wherein the processing circuitry is further configured to determine number of the pairs of candidate arrival angles based on relationship between the beam widths in the horizontal domain and the vertical domain determined based on the first number of antennas and the beam widths in the horizontal domain and the vertical domain determined based on the second number of antennas, and determine the pairs of candidate arrival angles based on the determined number by taking the pair of coarse arrival angles as a center, so that the determined number of pairs of candidate arrival angles are distributed evenly within a scope of the beam widths in the horizontal domain and the vertical domain determined based on the second number of antennas.

4. The apparatus according to claim 1, wherein the status parameter of the channel comprises a channel slow-varying characteristic parameter.

5. The apparatus according to claim 1, wherein the processing circuitry is further configured to:
generate an analog beamforming vector based on the pair of accurate arrival angles;
determine a physical channel between the base station and the user equipment based on the analog beamforming vector and an uplink equivalent channel estimated according to a sounding reference signal from the user equipment; and
generate a digital precoding vector based on the analog beamforming vector, the physical channel and a predetermined reception rule.

6. The apparatus according to claim 1, wherein the processing circuitry is further configured to:
generate an analog beamforming vector based on the pair of accurate arrival angles and a carrier frequency; and
generate a digital precoding vector based on channel status information fed back by the user equipment, wherein the channel status information is obtained by performing, by the user equipment, downlink equivalent channel estimation according to a reference signal, which is transmitted by the base station based on the pair of accurate arrival angles.

7. The apparatus according to claim 1, wherein the apparatus is the base station, and the base station further comprises:
a communication unit configured to receive uplink data from the user equipment according to an uplink equivalent channel, and transmit downlink data to the user equipment based on an analog beamforming vector and the digital precoding vector, wherein the uplink equivalent channel is estimated based on a sounding reference signal from the user equipment.

8. The apparatus according to claim 1, wherein the processing circuitry is further configured to:
determine a distance from the base station to the user equipment based on the determined pair of accurate arrival angles.

9. A method on a base station side in a wireless communication system, wherein the base station is provided with a first number of antennas and a second number of radio frequency chains, the second number being smaller than the first number, the method comprising:

estimating a pair of coarse arrival angles in a horizontal domain and a vertical domain based on the second number of antennas selected from the first number of antennas and the second number of radio frequency chains;
determining pairs of candidate arrival angles in the horizontal domain and the vertical domain based on the estimated pair of coarse arrival angles and beam widths in the horizontal domain and the vertical domain determined based on the first number of antennas and the second number of antennas respectively; and
calculating, according to a training signal from user equipment, a difference between a projection component and a real component for each of the pairs of candidate arrival angles, and determining the pair of candidate arrival angles with a minimum calculated difference as a pair of accurate arrival angles in the horizontal domain and the vertical domain for the user equipment, wherein the projection component is determined by projecting an actual received signal for the training signal of the base station onto a steering vector defined based on each of the pairs of candidate arrival angles, and the real component is determined based on the training signal and a status parameter of a channel between the base station and the user equipment.

10. The method according to claim 9, wherein the number of the pairs of candidate arrival angles is determined based on relationship between the beam widths in the horizontal domain and the vertical domain determined based on the first number of antennas and the beam widths in the horizontal domain and the vertical domain determined based on the second number of antennas, and the pairs of candidate arrival angles are determined based on the determined number by taking the pair of coarse arrival angles as a center, so that the determined number of pairs of candidate arrival angles are distributed evenly within a scope of the beam widths in the horizontal domain and the vertical domain determined based on the second number of antennas.

11. The method according to claim 9, further comprising:
generating an analog beamforming vector based on the pair of accurate arrival angles;
determining a physical channel between the base station and the user equipment based on the analog beamforming vector and an uplink equivalent channel estimated according to a sounding reference signal from the user equipment; and
generating a digital precoding vector based on the analog beamforming vector, the physical channel and a predetermined reception rule.

12. The method according to claim 9, further comprising:
generating an analog beamforming vector based on the pair of accurate arrival angles and a carrier frequency; and
generating a digital precoding vector based on channel status information fed back by the user equipment, wherein the channel status information is obtained by performing, by the user equipment, downlink equivalent channel estimation according to a reference signal, which is transmitted by the base station based on the pair of accurate arrival angles.

13. The method according to claim 9, further comprising:
receiving uplink data from the user equipment according to an uplink equivalent channel, and transmitting downlink data to the user equipment based on an analog beamforming vector and a digital precoding vector, wherein the uplink equivalent channel is estimated based on a sounding reference signal from the user equipment.

14. The method according to claim 9, further comprising:
determining a distance from the base station to the user equipment based on the determined pair of accurate arrival angles.

* * * * *